US012808515B1

(12) United States Patent
Li

(10) Patent No.: US 12,808,515 B1
(45) Date of Patent: Nov. 24, 2026

(54) AMBIENT PROJECTION LAMP

(71) Applicant: Guangzhou Lihe Electronic Technology Co., Ltd., Guangzhou (CN)

(72) Inventor: Jialin Li, Zhuhai (CN)

(73) Assignee: Guangzhou Lihe Electronic Technology Co., Ltd., Guangzhou (CN)

( * ) Notice: Subject to any disclaimer, the term of this patent is extended or adjusted under 35 U.S.C. 154(b) by 3 days.

(21) Appl. No.: 19/382,294

(22) Filed: Nov. 7, 2025

(30) Foreign Application Priority Data

Sep. 23, 2025 (CN) ......................... 202522065001.0

(51) Int. Cl.
*F21V 14/08* (2006.01)
*F21V 5/04* (2006.01)
*F21V 17/10* (2006.01)
*F21V 19/00* (2006.01)

(52) U.S. Cl.
CPC ................ *F21V 14/08* (2013.01); *F21V 5/04* (2013.01); *F21V 17/10* (2013.01); *F21V 19/0035* (2013.01)

(58) Field of Classification Search
CPC . F21V 14/08; F21V 5/04; F21V 17/10; F21V 19/0035
See application file for complete search history.

(56) References Cited

U.S. PATENT DOCUMENTS

| | | | | |
|---|---|---|---|---|
| 8,057,045 B2 * | 11/2011 | Johnson | ................. | G09B 27/04 362/121 |
| 11,118,753 B1 * | 9/2021 | Zheng | ..................... | F21V 3/049 |
| 2022/0243895 A1 * | 8/2022 | Xu | ............................ | F21V 7/10 |

FOREIGN PATENT DOCUMENTS

| | | |
|---|---|---|
| CN | 214468328 U | 10/2021 |
| CN | 217684550 U | 10/2022 |
| CN | 217693791 U | 10/2022 |
| CN | 218153818 U | 12/2022 |

* cited by examiner

*Primary Examiner* — Tracie Y Green
(74) *Attorney, Agent, or Firm* — JEEN IP LAW, LLC

(57) ABSTRACT

The present disclosure discloses an ambient projection lamp, which comprises a first ambient assembly. The first ambient assembly comprises a first lamp body and a projection element positioned above the first lamp body. The projection element comprises a first projection section and a second projection section. The light from the first lamp body passes through the first projection section and is projected outward to form a first projected region, while the light from the first lamp body passes through the second projection section and is projected outward to form a second projected region. The luminance of the first projected region is higher than that of the second projected region, and the colors of the first projected region and the second projected region are different. This design enhances the diversity of the projection effects and elevates the ambiance and immersive experience of the projection.

10 Claims, 23 Drawing Sheets

AMBIENT PROJECTION LAMP

CROSS-REFERENCE TO RELATED APPLICATIONS

The application claims priority to Chinese patent application No. 202522065001.0, filed on Sep. 23, 2025, and entitled "AMBIENT PROJECTION LAMP," the entire contents of which are incorporated herein by reference.

TECHNICAL FIELD

The present disclosure pertains to the technical field of projection lamps, particularly relating to a projection lamp with dynamic effects.

BACKGROUND

There exists an ambient projection lamp, which comprises a base, a motor mounted on the base, a lamp panel, a pattern cover, and a magic brick outer casing. The pattern cover is positioned above the lamp panel, and the magic brick outer casing is placed over the outer side of the pattern cover. The pattern cover includes multiple hollowed-out pattern holes, and the light emitted from the lamp panel passes through these hollowed-out pattern holes to form single-color patterns externally. Alternatively, it can be that a projection scheme using a single-color film is commonly adopted in existing ambient projection lamps to project patterns onto a target surface, creating decorative light spots. This scheme features a simple structure and low cost, effectively creating a specific environmental ambiance. However, this traditional single-lamp, single-film scheme has obvious limitations. The entire light spot pattern it projects is usually a uniform whole in terms of both luminance and color, or its luminance variation is merely determined by the density of the patterns, lacking intentional, strongly contrasting light and dark layering designs.

Therefore, there is a need to design a new type of ambient projection lamp to overcome the aforementioned issues.

SUMMARY

In response to the issues faced in the background technology, the present disclosure provides an ambient projection lamp capable of creating multi-color projected regions.

In order to achieve the aforementioned objective, the present disclosure employs the following technical solution.

a first ambient assembly comprising a first lamp body, a projection element and an imaging element located above the first lamp body; the projection element is configured as a film, a photographic film, a projection slide, a glass slide, or a slide; the projection element comprises a first projection portion and a second projection portion; light emitted by the first lamp body passes through the first projection portion to form a first projected region outward; the light emitted by the first lamp body passes through the second projection portion to form a second projected region outward; a color of the first projected region is different from that of the second projected region; the first projected region and the second projected region together constitute the first projection effect of the first ambient assembly; a projected region of the first projection effect is defined as S1;

a second ambient assembly at least comprising a second lamp body, a projection screen located above the second lamp body, and an imaging lens located above the projection screen; the second ambient assembly forms a second projection effect outward; the second projection effect is an animated projection; a projected region of the second projection effect is defined as S2, and the projected region S2 is less than the projected region S1; the first projection effect and the second projection effect blend with each other.

In certain embodiments, wherein S2 of the second projection effect is less than ½ of S1 of the first projection effect.

In certain embodiments, wherein projection width of the first projection effect is defined as W1, and a central axis of the first projection effect is defined as A1; projection width of the second projection effect is defined as W2, and W1 is greater than W2; a central axis of the second projection effect is A2, and A1 and A2 either coincide or are misaligned with each other.

In certain embodiments, wherein the first projection effect forms a dynamic or static light effect; the second projection effect is a video animation projection; the video animation projection is located in the middle position of the first projection effect; the video animation projection gradually becomes clear, or the overlapping position between the second projection effect and the first projection effect continuously changes.

In certain embodiments, wherein the imaging element at least comprises a first lens; width of the first lens is defined as d1, and width of a light-transmitting area of the projection element is defined as d2, where d1 is greater than or equal to d2.

6. An ambient projection lamp, comprising:

a first ambient assembly comprising a first lamp body, a projection element and an imaging element located above the first lamp body; a projection element is located between the first lamp body and the imaging element; the projection element is configured as a projection slide or a wrinkled optical sheet; the projection slide or the wrinkled optical sheet comprises a first projection portion and a second projection portion; light emitted by the first lamp body passes through the first projection portion and the imaging element outward to form a first projected region; the light emitted by the first lamp body passes through the second projection portion and the imaging element outward to form a second projected region; a color of the first projected region is different from that of the second projected region, or intensity of the light effects in the first projected region is different from that in the second projected region.

In certain embodiments, wherein the first ambient assembly comprises a rotating disk; the rotating disk comprises an upper disk body, a lower disk body, and at least one projection slide fixed between the upper disk body and the lower disk body; the upper disk body or the lower disk body is provided with an installation slot, and the projection slide is accommodated in the installation slot; the projection element is exposed upward from the upper disk body and downward from the lower disk body; the upper disk body and the lower disk body are fixed in at least one of the following ways: snap-fit structure fixation, ultrasonic fixation, adhesive bonding fixation, or screw fixation.

In certain embodiments, wherein the projection slide is a glass slide comprising a glass substrate, a coated area, and a photolithographed area, wherein part of the coated area is arranged around the photolithographed area.

In certain embodiments, wherein the projection element comprises an upper projection slide and a lower projection slide; the lower projection slide comprises a first surface and a second surface that are opposite to each other, and the first surface is a pattern surface; the upper projection slide comprises a third surface and a fourth surface that are opposite to each other, and the third surface is a pattern surface; the first surface and the third surface are opposite to each other, and the second surface and the fourth surface are away from each other.

In certain embodiments, wherein: when the ambient projection lamp is in operation, light passes through the upper projection slide to project a dynamic first projection pattern outward, and light passes through the lower projection slide to project a dynamic second projection pattern outward; at least part of the dynamic first projection pattern and at least part of the dynamic second projection pattern change from being separated to overlapping with each other.

In certain embodiments, wherein the first ambient assembly further comprises a fisheye lens located above the imaging element; the imaging element comprises a first lens, a second lens, and a third lens; the fisheye lens comprises a fisheye lens element located above the third lens.

In certain embodiments, wherein a central axis of the imaging element is defined as P1, and a central axis of the projection slide is defined as P2; P1 and P2 do not coincide; at least part of the projection slide is located directly below the imaging element; as the projection slide rotates, the position where the projection slide and the imaging element are aligned in the vertical direction continuously changes, causing the first projection pattern projected outward by the first ambient assembly to gradually change.

In certain embodiments, wherein patterns of the first projection portion and the second projection portion are different; when the rotating disk is in a first state, the first projection portion and the imaging element are aligned vertically, and a first projection pattern is projected outward; as the rotating disk rotates, the rotating disk is in a second state, the second projection portion and the imaging element are aligned vertically, and a second projection pattern is projected outward.

In certain embodiments, wherein the imaging element at least comprises a first lens; width of the first lens is defined as d1, and the first lens is the imaging lens closest to the projection slide; a distance between the projection slide and the first lens is defined as D6, wherein D6 satisfies $\frac{1}{4}d1 \leq D6 \leq 4d1$.

In certain embodiments, wherein the imaging element comprises a plurality of lenses, and at least one of the lenses has an anti-reflection coating on its surface; the anti-reflection coating is provided on the bottom surface or the top surface of the lens.

16. An ambient projection lamp, comprising:

a base;

a first ambient assembly installed on the base and at least comprising a first lamp body and a projection element located above the first lamp body; the projection element comprises at least one of the following: a film, a photographic film, a projection slide, a glass slide, or a slide; the projection element comprises a first projection portion and a second projection portion; light emitted by the first lamp body passes through the first projection portion to project outward and form a first projected region; light emitted by the first lamp body passes through the second projection portion to project outward and form a second projected region; luminance of the first projected region is higher than that of the second projected region, and colors of the first projected region and the second projected region are different.

In certain embodiments, wherein the projection element is configured as the projection slide; the first projection portion comprises a main projection portion and an outline arranged around the main projection portion; a minimum width of a chip of the first lamp body is greater than 0.2 mm, and a width of the outline is greater than that of the chip.

In certain embodiments, wherein the projection slide comprises a first end face and a second end face that are opposite to each other, and length of the second end face is greater than that of the first end face.

In certain embodiments, wherein the ambient projection lamp comprises a support frame and a driving assembly that drives the support frame; the projection slide is provided on the support frame; the driving assembly comprises a drive shaft, and the support frame is fixedly connected to the drive shaft; or the driving assembly comprises a gear, and the gear meshes with a gear ring of the support frame.

In certain embodiments, wherein the first ambient assembly comprises a support frame; the projection slide is installed on the support frame, is arranged around the axis of the support frame, and rotates around the axis of the support frame; a distance between the projection slide and the first lamp body is defined as d3, wherein d3 satisfies 20 mm$\leq$d3$\leq$100.

In certain embodiments, wherein the ambient projection lamp comprises a support frame installed on the base and a first projection slide installed on the support frame; the support frame comprises amounting hole penetrating upward; the mounting hole comprises a width of d1 and a width of d2; when d1 is greater than d2, the first projection slide is installed in the mounting hole from top to bottom; when d1 is less than d2, the first projection slide is installed in the mounting hole from bottom to top; at least part of the first projection slide fits against an inner wall or an outer wall of the mounting hole.

Compared with the prior art, the ambient projection lamp of the present disclosure offers the following beneficial effects.

The first ambient assembly is mounted on the base and comprises at least a first lamp body and a projection element positioned above the first lamp body. The projection element includes at least one of the following: a film, a photographic film, a projection slide, a glass slide, or a slide. The projection element comprises a first projection section and a second projection section. The light from the first lamp body passes through the first projection section and projects outward to form a first projected region. Meanwhile, the light from the first lamp body passes through the second projection section and projects outward to form a second projected region. The luminance of the first projected region is higher than that of the second projected region, and the colors of the first and second projected regions are different. By creating projected regions with different projection colors and luminance levels, the diversity of the projection effect is enhanced, thereby elevating the sense of ambiance and immersion in the projection.

Figure 1:
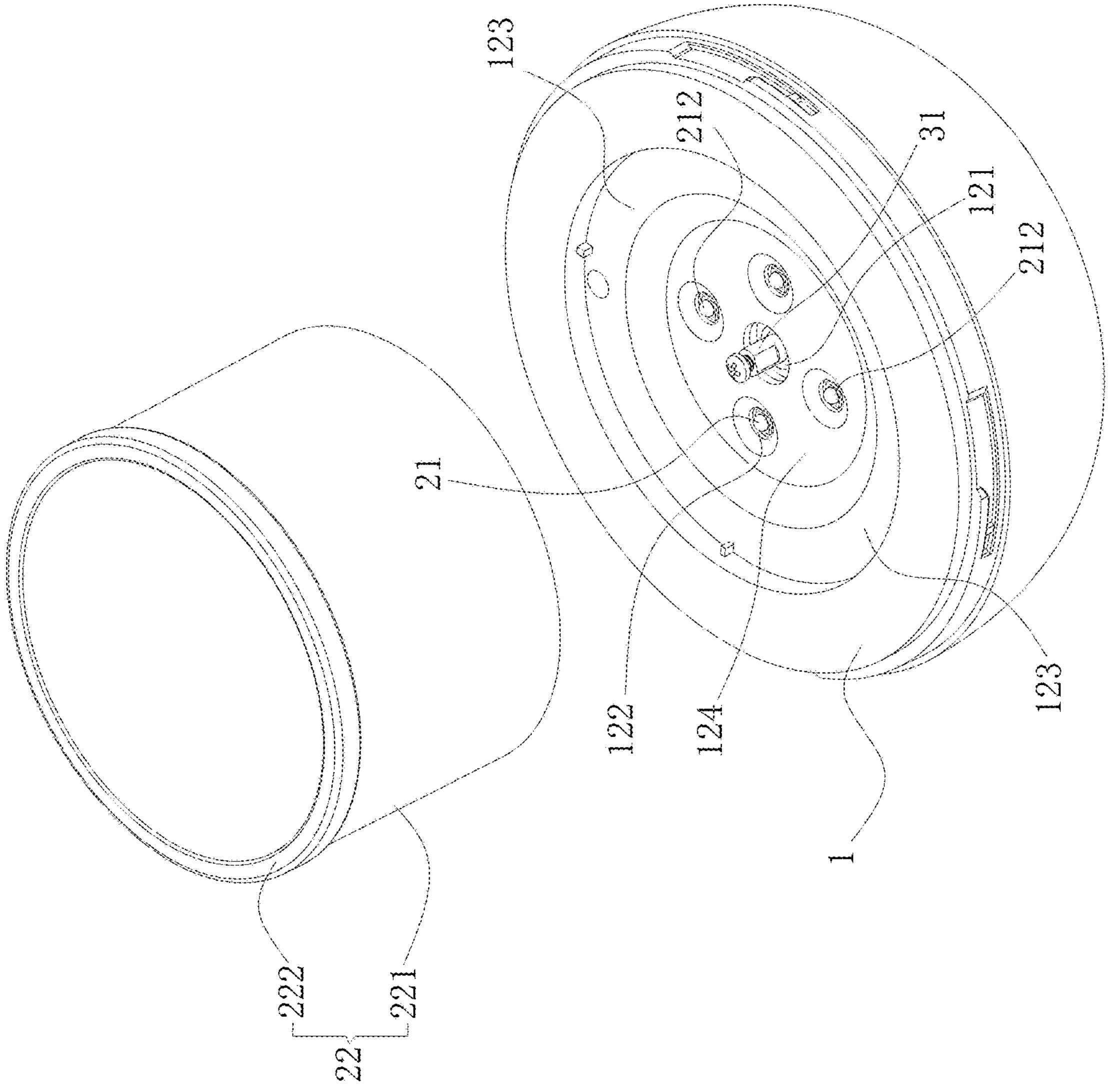
FIG. 1 is an exploded isometric view of the first embodiment of the ambient projection lamp according to the present disclosure.

Reference numerals in the specific embodiments:

| The first embodiment | | | |
|---|---|---|---|
| Ambient projection lamp 100 | Base 1 | Bottom shell 11 | Limiting wall 111 |
| Top cover 12 | First hole 121 | Second hole 122 | First groove 123 |
| Second groove 124 | Light-guiding surface 125 | Light-blocking portion 126 | Receiving cavity 13 |
| First ambient assembly 2 | First lamp body 21 | Lamp board 211 | Light beads 212 |
| Support frame 22 | First frame 221 | Main body portion 2211 | Fixing portion 2212 |
| Mounting hole 2213 | Support portion 2214 | Limiting structures 2215 | Second frame 222 |
| Through-hole 2221 | Blocking portion 2222 | Mating portion 2223 | Projection element 23 |
| First projection slide 231 | First end face 2311 | Second end face 2312 | Outline 2313 |
| First projection section 2314 | Second projection section 2315 | Second projection slide 232 | Driving assembly 3 |
| Driving shaft 31 | Fasteners 4 | Speaker 5 | |

| The second embodiment | | | |
|---|---|---|---|
| Ambient projection lamp 100' | Base 1' | Bottom shell 11' | Limiting wall 111' |

-continued

| The second embodiment | | | |
|---|---|---|---|
| Top cover 12' | First hole 121' | First limiting portion 122' | First groove 123' |
| Second limiting portion 124' | Supporting column 125' | Positioning portion 126' | Guiding groove 127' |
| Latch 128' | Receiving cavity 13' | Turntable 14' | Clearance hole 141' |
| Rotating shaft 142' | Gear ring 143' | Slot 144' | Snap-fit portion 145' |
| Light-blocking portion 146' | First ambient assembly 2' | First lamp body 21' | Lamp board 211' |
| Through-hole 212' | Light beads 213' | Fixing hole 214' | Support frame 22' |
| First frame 221' | Main body portion 2211' | Mounting hole 2212' | Support portion 2213' |
| Limiting structures 2214' | Snap hook 2215' | Second frame 222' | Through-hole 2221' |
| Blocking portion 2222' | Mating portion 2223' | Projection element 23' | First projection slide 231' |
| First end face 2311' | Second end face 2312' | Outline 2313' | First projection section 2314' |
| Second projection section 2315' | Second projection slide 232' | Light-transmitting cover 3' | Driving assembly 4' |
| Speaker 5' | Detector 6' | Transmitting end 61' | Receiving end 62' |
| Conductive wire 7' | | | |

| The third embodiment | | | |
|---|---|---|---|
| Ambient projection lamp 100" | Base 1" | First shell 11" | Projection hole 111" |
| Second shell 12" | Receiving cavity 13" | Plugging and unplugging port 14" | First ambient assembly 2" |
| First lamp body 21" | Tray 22" | Light-transmitting hole 221" | Rotating disk 23" |
| Limiting member 231" | Through-hole 2311" | Lower bearing portion 2312" | Upper limiting portion 2313" |
| Lower limiting portion 2314" | Lower projection slide 232" | First surface 2321" | Second surface 2322" |
| Upper projection slide 233" | Third surface 2331" | Fourth surface 2332" | Toothed ring portion 234" |
| Opening 2341" | Upper bearing portion 2342" | Teeth 2343" | Pressing plate 235" |
| Upper disc body 236" | Lower disc body 237" | Mounting slot 238" | Imaging element 24" |
| First lens 241" | Second lens 242" | Third lens 243" | Fisheye lens 25" |
| Imaging lens 251" | Fisheye lens element 252" | Second ambiance assembly 3" | Second lamp body 31" |
| Projection screen 32" | Imaging lens 33" | | |

DETAILED DESCRIPTION OF THE EMBODIMENTS

In order to facilitate a better understanding of the objectives, structure, features, and efficacy of the present disclosure, further explanations are provided herein in conjunction with the accompanying drawings and specific embodiments.

As shown in FIGS. 1 to 6, the first embodiment of the ambient projection lamp 100 of the present disclosure is illustrated. The ambient projection lamp 100 comprises a base 1, as well as a first ambient assembly 2, a driving assembly 3, a fastener 4, and a speaker 5 mounted on the base 1.

Figure 6:
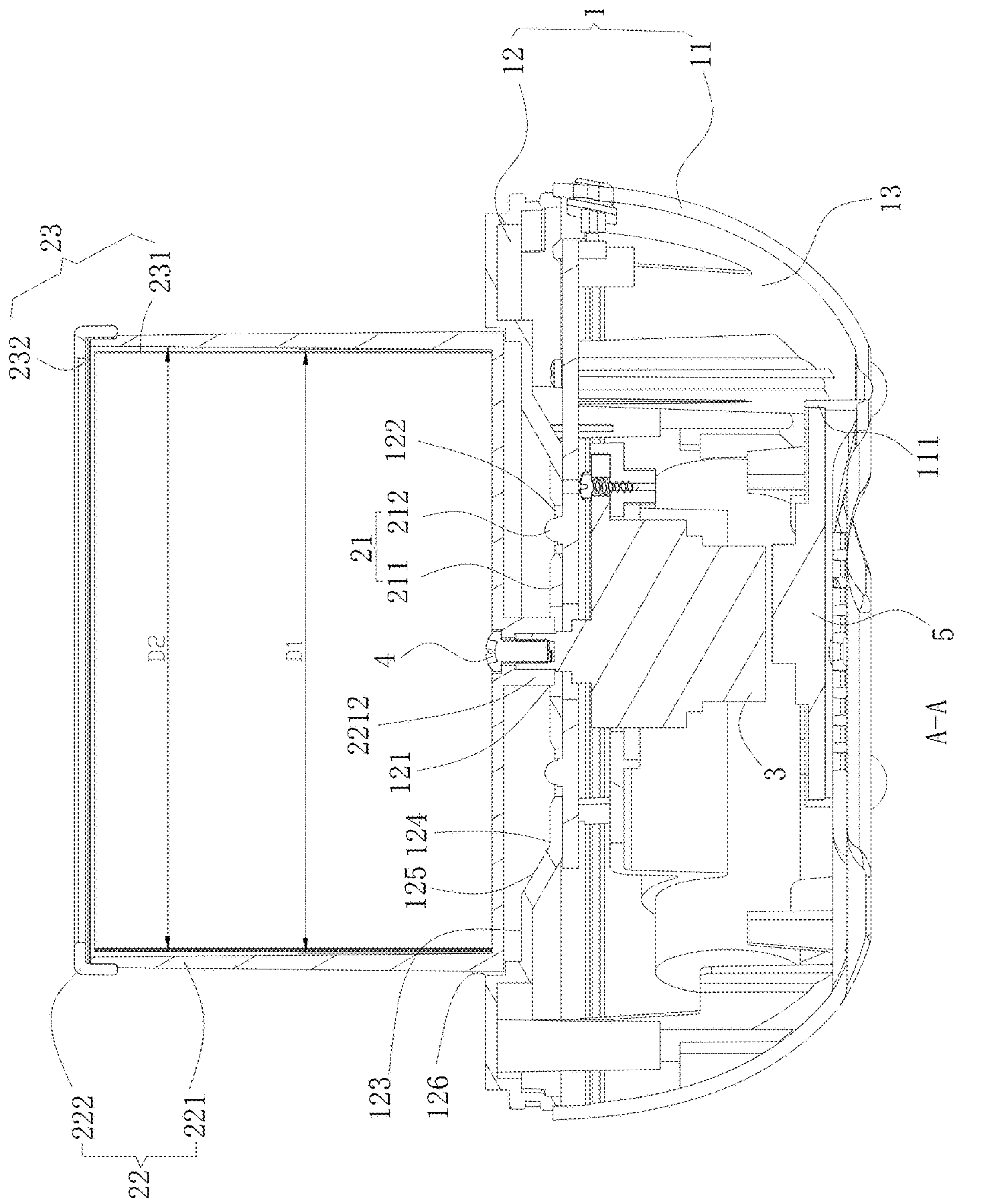
FIG. 6 is a cross-sectional view taken along line A-A in FIG. 5.

As depicted in FIGS. 1 and 6, the base 1 includes a receiving cavity 13, as well as a bottom shell 11 and a top cover 12 that form the receiving cavity 13. The bottom shell 11 includes a limiting wall protruding into the receiving cavity 13, and the limiting wall 111 is arranged around the speaker hole of the bottom cover. The top cover 12 includes a first hole 121 penetrating upward, multiple second holes 122 arranged around the first hole 121, a first groove 123, and a second groove 124. The second holes 122 penetrate upward through the top cover 12, and both the first hole 121 and the second holes 122 are vertically connected to the receiving cavity 13. The first groove 123 is arranged around the second groove 124. The first groove 123 is located above the second groove 124. The top cover 12 also includes a light-guiding surface 125 and a light-blocking portion 126. The light-guiding surface 125 connects the bottom wall of the first groove 123 and the bottom wall of the second groove 124, and extends obliquely. The side of the first groove 123 forms the light-blocking portion 126, which is arranged around the first hole 121.

Figure 2:
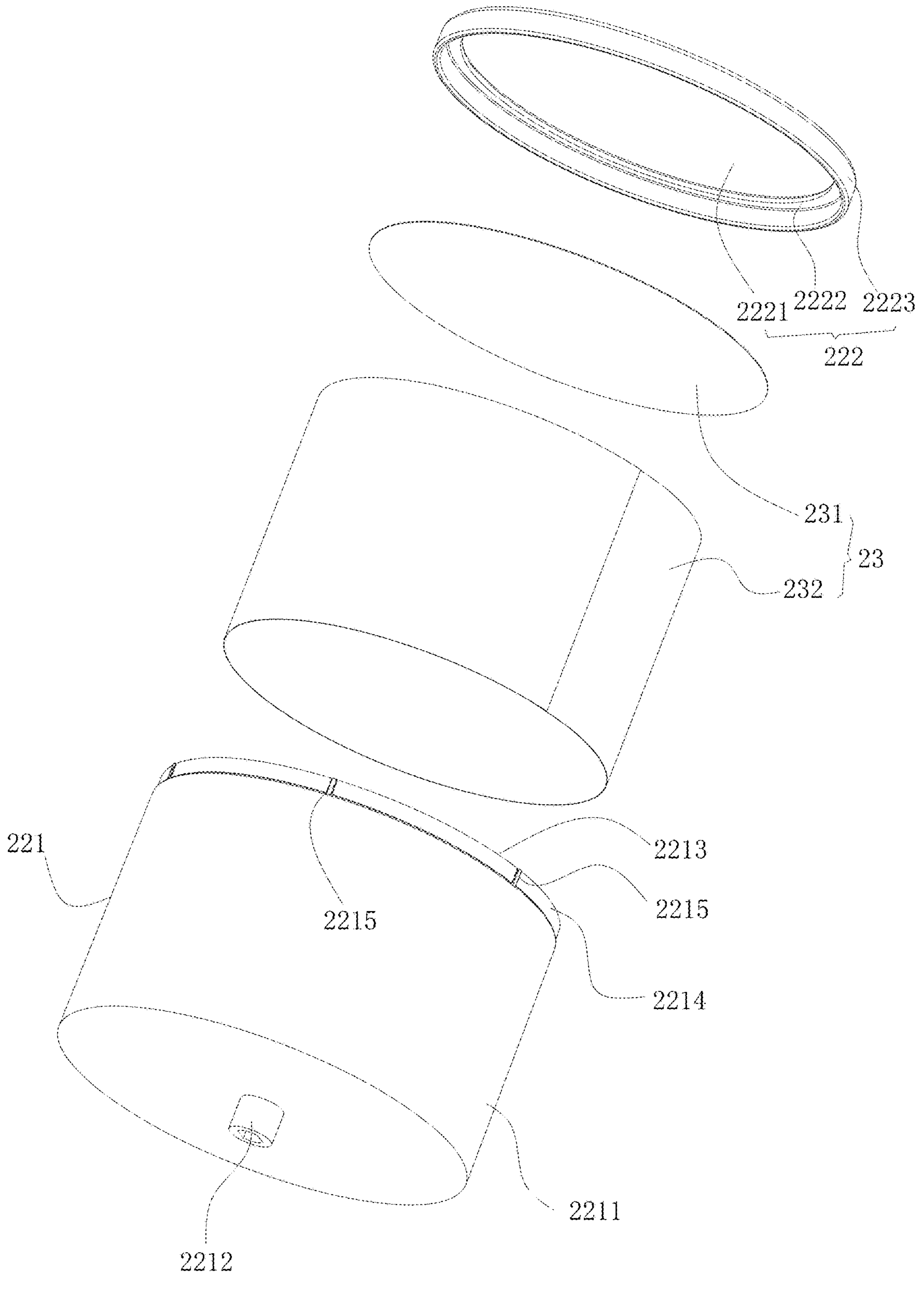
FIG. 2 is an exploded isometric view of the support frame and projection element in FIG. 1.
Figure 3:
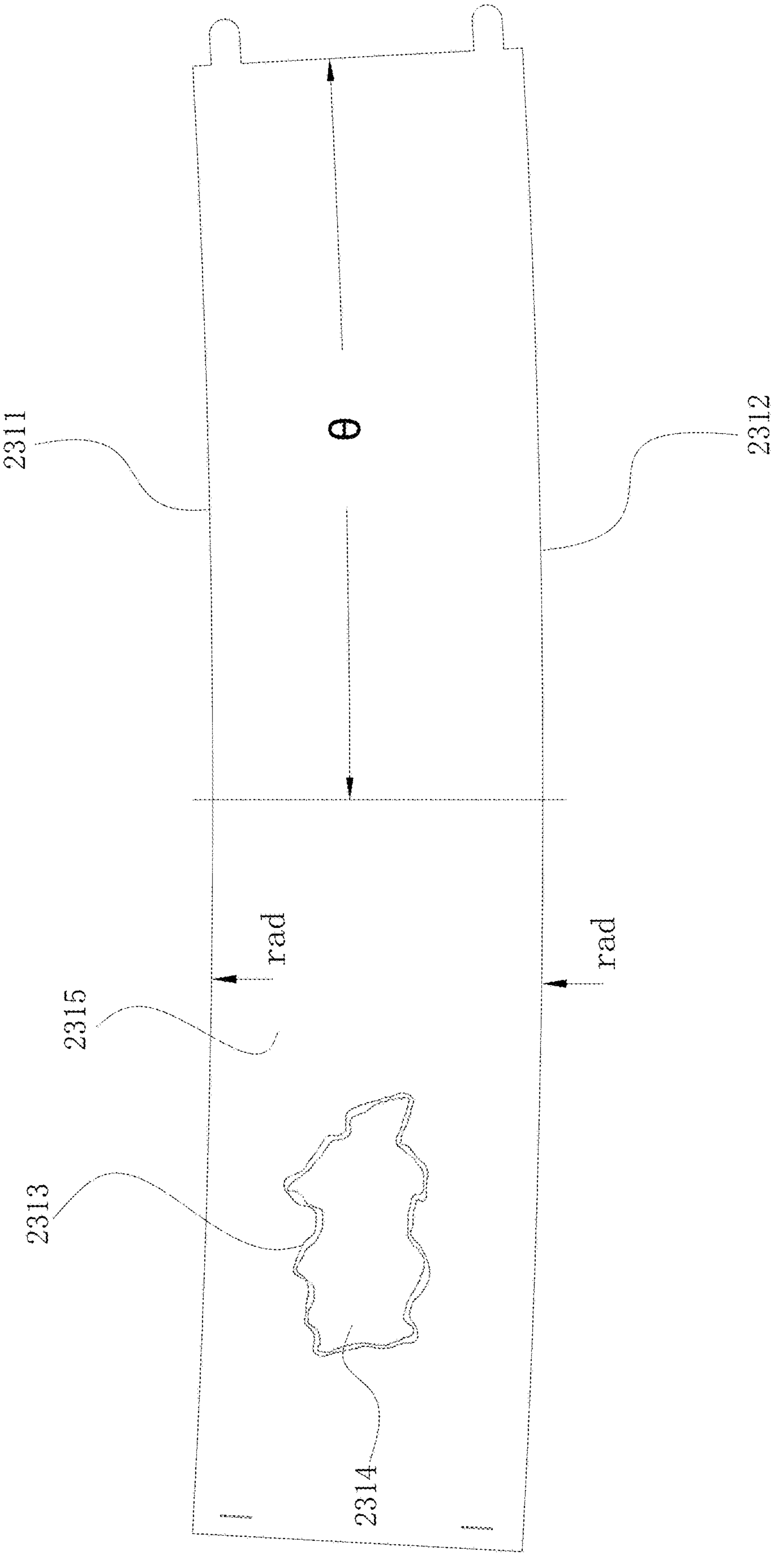
FIG. 3 is a schematic diagram showing the first projection slide in an unfolded state in FIG. 2.
Figure 4:
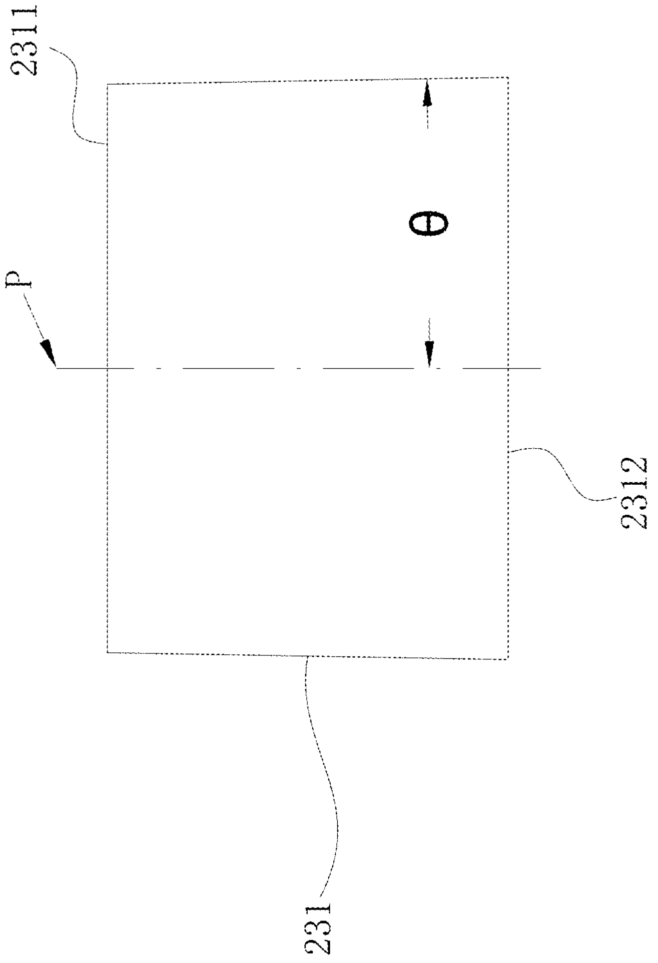
FIG. 4 is a schematic diagram showing the first projection slide in an installed state in FIG. 2.
Figure 5:
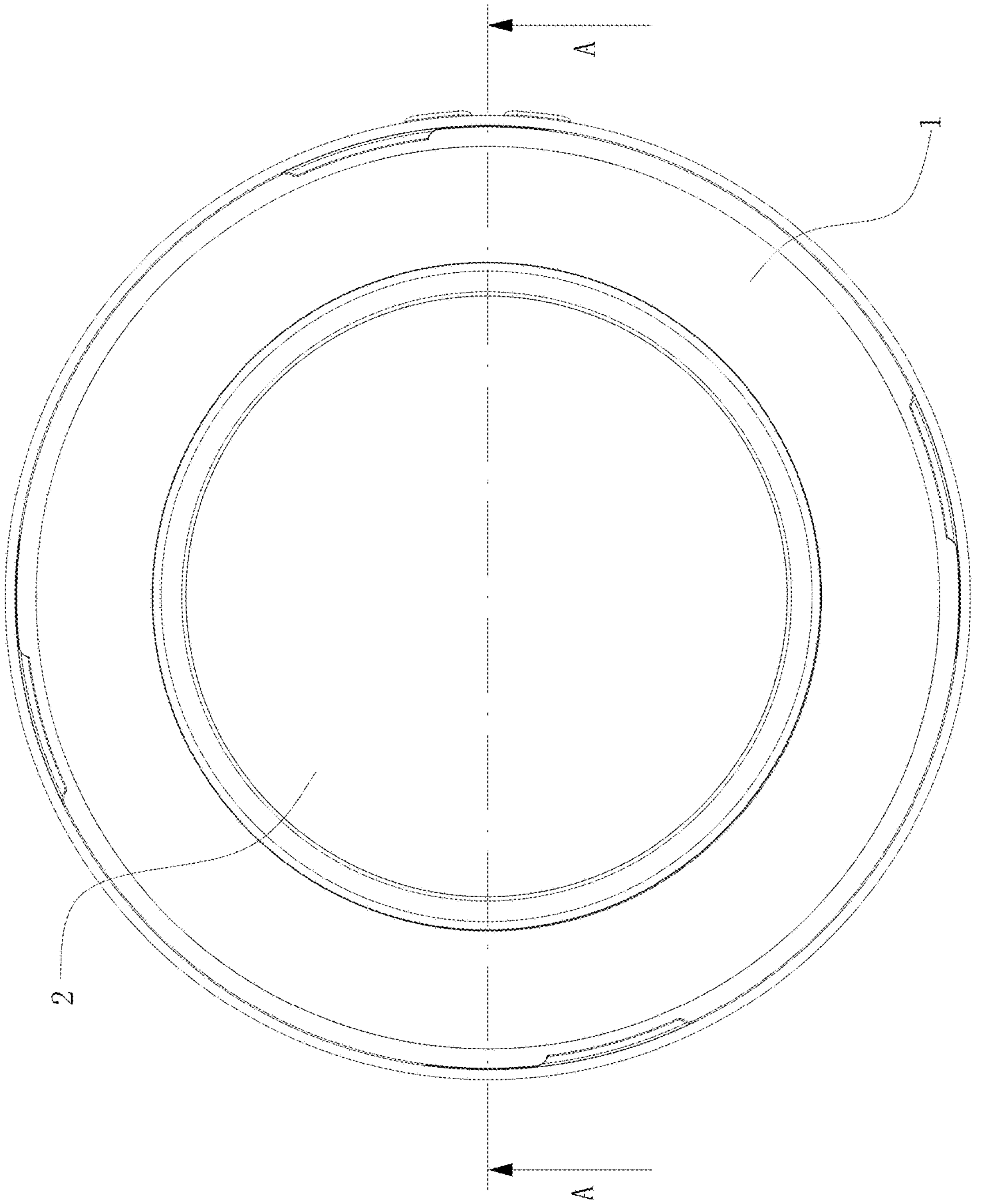
FIG. 5 is a top view of the assembled structure in FIG. 1.

As shown in FIGS. 2, 3, and 6, the first ambient assembly 2 comprises a first lamp body 21, a support frame 22 positioned above the first lamp body 21, and a projection element 23 mounted on the support frame 22. The first lamp body 21 includes a lamp board 211 and light beads 212 installed on the lamp board 211. The light beads 212 comprise a chip and a protective layer covering the chip. The minimum width of the chip is defined as being greater than 0.2 mm. The light beads 212 are exposed upward through the second holes 122, with the lamp board 211 located within the receiving cavity 13 and beneath the top cover 12. The support frame 22 includes a first frame 221 and a second frame 222 that are fixed to each other. The first frame 221 comprises a main body portion 2211, a fixing portion 2212 extending downward from the main body portion 2211, and a support portion 2214 extending upward. The main body portion 2211 has a hollow structure comprising a bottom wall and side walls surrounding the bottom wall. A mounting hole 2213 is formed in the center of the main body portion 2211, with the mounting hole 2213 having a width D1 at the bottom end and a width D2 at the top end, with D2>D1. The mounting hole 2213 gradually widens from top to bottom, facilitating the installation and removal of the projection slide. The bottom wall of the main body portion 2211 is positioned above the light beads 212 without contacting them, which is beneficial for heat dissipation and uniform illumination. The bottom wall of the main body portion 2211 is accommodated within the first groove 123 and located above the light-guiding surface 125. The light-guiding surface 125 directs more light to the projection element 23. The fixing portion 2212 extends downward from the bottom wall, and the support portion 2214 connects downward to the side walls. The support portion 2214 includes multiple limiting structures 2215 that are exposed outward. The second frame 222 includes a through-hole 2221, a blocking portion 2222 surrounding the through-hole 2221, and a mating portion 2223. The mating portion 2223 surrounds the support portion 2214, with the blocking portion 2222 located above the support portion 2214. The limiting structures 2215 abut against the mating portion 2223. The limiting structures 2215 can be bumps connected to the support portion 2214, or in other embodiments, they can be additional limiting tabs positioned between the support portion 2214 and the mating portion 2223, forming a tight fit among the three parts. The projection element 23 includes at least one of the following: a film, a photographic film, a projection slide, a glass slide, a slide, or a wrinkled optical sheet. The projection element 23 comprises a first projection section 2314 and a second projection section 2315, which differ in light transmittance. In this embodiment, the projection element 23 includes a first projection slide 231 and a second projection slide 232 positioned above the first projection slide 231. The first projection slide 231 or the second projection slide 232 includes a first projection section 2314 and a second projection section 2315. The light from the first lamp body 21 passes through the first projection section 2314 to form a first projected region outward, and the light from the first lamp body 21 passes through the second projection section 2315 to form a second projected region outward. The luminance of the first projected region is higher than that of the second projected region, and the colors of the first and second projected regions are different. The first projection section 2314 includes a main projection section and a outline 2313 surrounding the main projection section, with the width of the outline 2313 being greater than the width of the chip. The first projection slide 231 includes a first end face 2311 and a second end face 2312 that are oppositely disposed, with the length of the second end face 2312 being greater than that of the first end face 2311. The first projection slide 231 is installed in the mounting hole 2213 from top to bottom or from bottom to top, with at least a portion of the first projection slide 231 fitting against the inner or outer wall of the mounting hole 2213. When the first projection slide 231 is installed from top to bottom in the mounting hole 2213, it forms a conical structure. When the light emitted by the first lamp body 21 is projected onto the inner surface of the first projection slide 231, some stray light is reflected. Due to the conical structure of the first projection slide 231, the reflected stray light is projected downward, reducing the amount of stray light projected upward onto the second projection slide 232 and minimizing its impact on the projection effect. The projection slides are arranged around the axis of the support frame 22 and can rotate around it. The distance between the first projection slide 231 and the first lamp body 21 is defined as D3, with D3 satisfying 20 mm≤D3≤100 mm. If the first projection slide 231 is too close to the first light-emitting body, the projected pattern will be too small and unclear. If the first projection slide 231 is too far from the first light-emitting body, the product volume of the first ambient assembly 2 will be too large, leading to high costs. D3 generally refers to the straight-line or shortest distance from the light beads 212 to the first projection slide 231. The second projection slide 232 is accommodated within the through-hole 2221, with the support portion 2214 and the blocking portion 2222 clamping the first projection slide 231. The second projection slide 232 is positioned directly above the first projection slide 231.

As shown in FIG. 6, the driving assembly 3 is accommodated within the receiving cavity 13 and includes a driving shaft 31 that extends upward and protrudes into the fixing portion 2212. The fastener 4 secures the fixing portion 2212 to the driving shaft 31. The driving shaft 31 rotates the support frame 22. In other embodiments, the driving assembly 3 includes gears that mesh with teeth on the support frame 22. The limiting wall 111 surrounds the speaker 5, forming a horizontal limiting structure for the speaker 5. Multiple screws are fixed to one side of the limiting wall 111, with the screw caps restricting the upward movement of the speaker 5.

As shown in FIGS. 7 to 13, it is the second embodiment of the ambient projection lamp 100' of the present disclosure. The ambient projection lamp 100' comprises a base 1', as well as a first ambient assembly 2', a light-transmitting cover 3', a driving assembly 4', a speaker 5', a detector 6', and a conductive wire 7' mounted on the base 1'.

Figure 8:
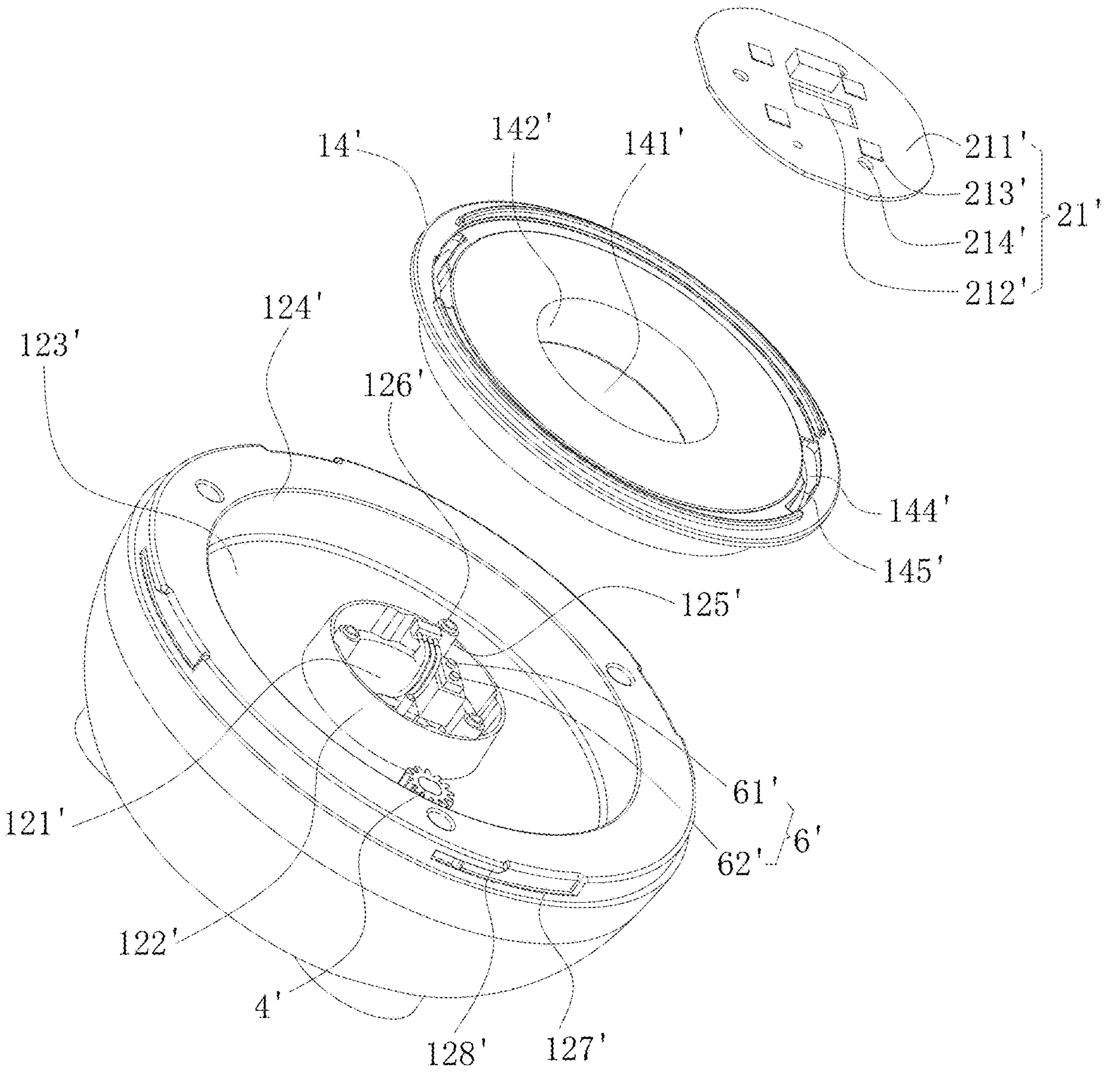
FIG. 8 is an exploded isometric view of the base, turntable, and lamp panel in FIG. 7.
Figure 9:
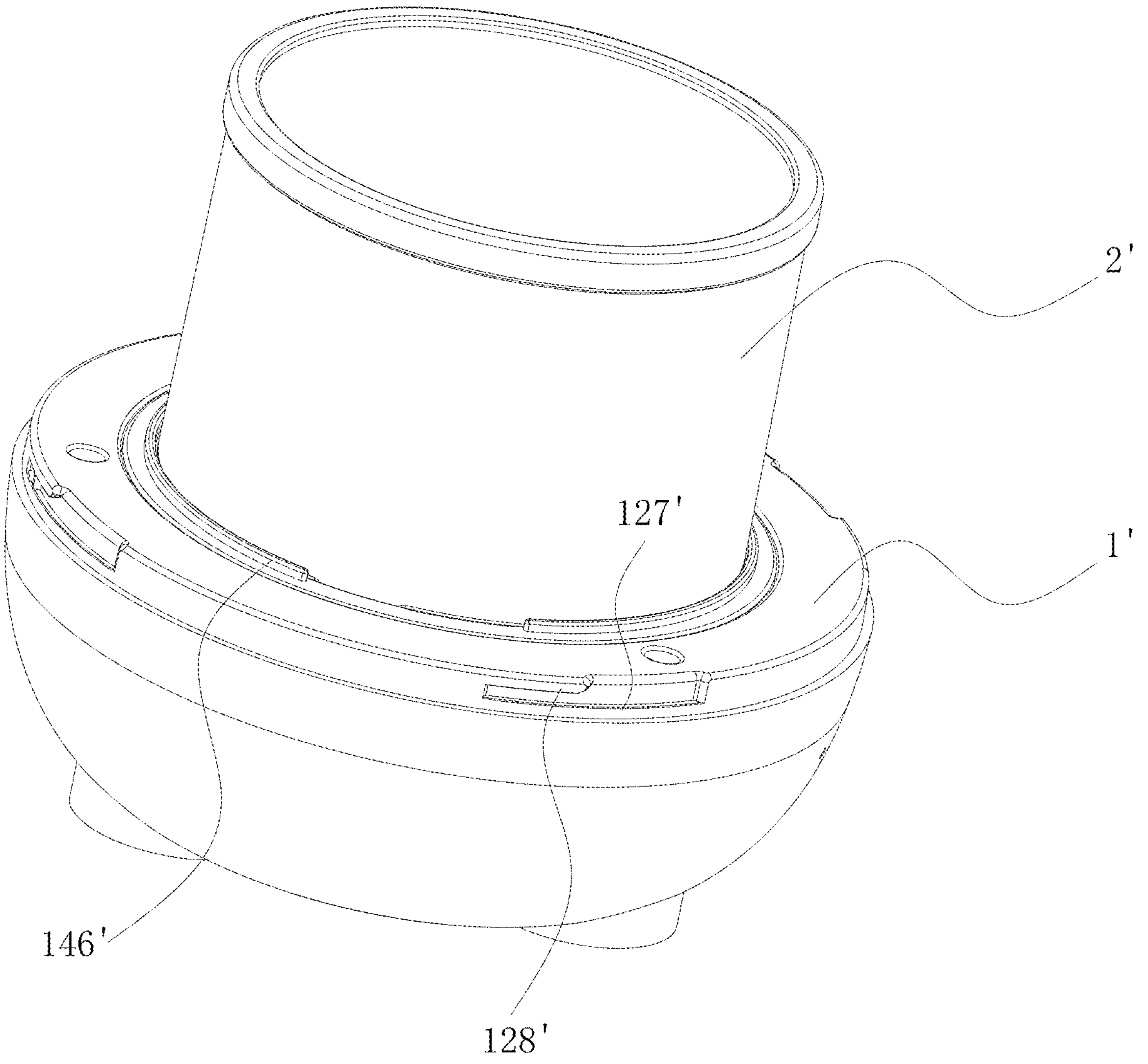
FIG. 9 is an assembled isometric view of FIG. 7 with the translucent cover removed.
Figure 10:
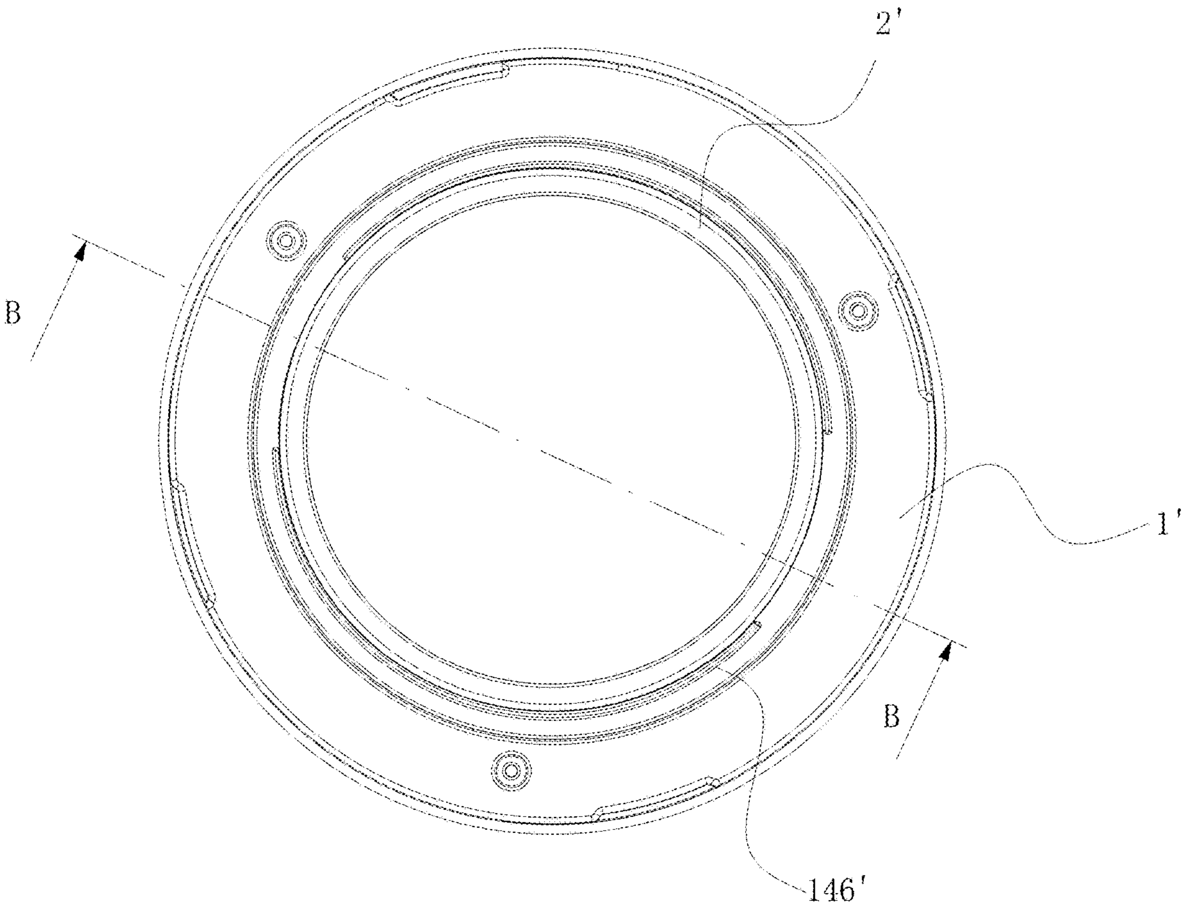
FIG. 10 is a top view of FIG. 9.
Figure 11:
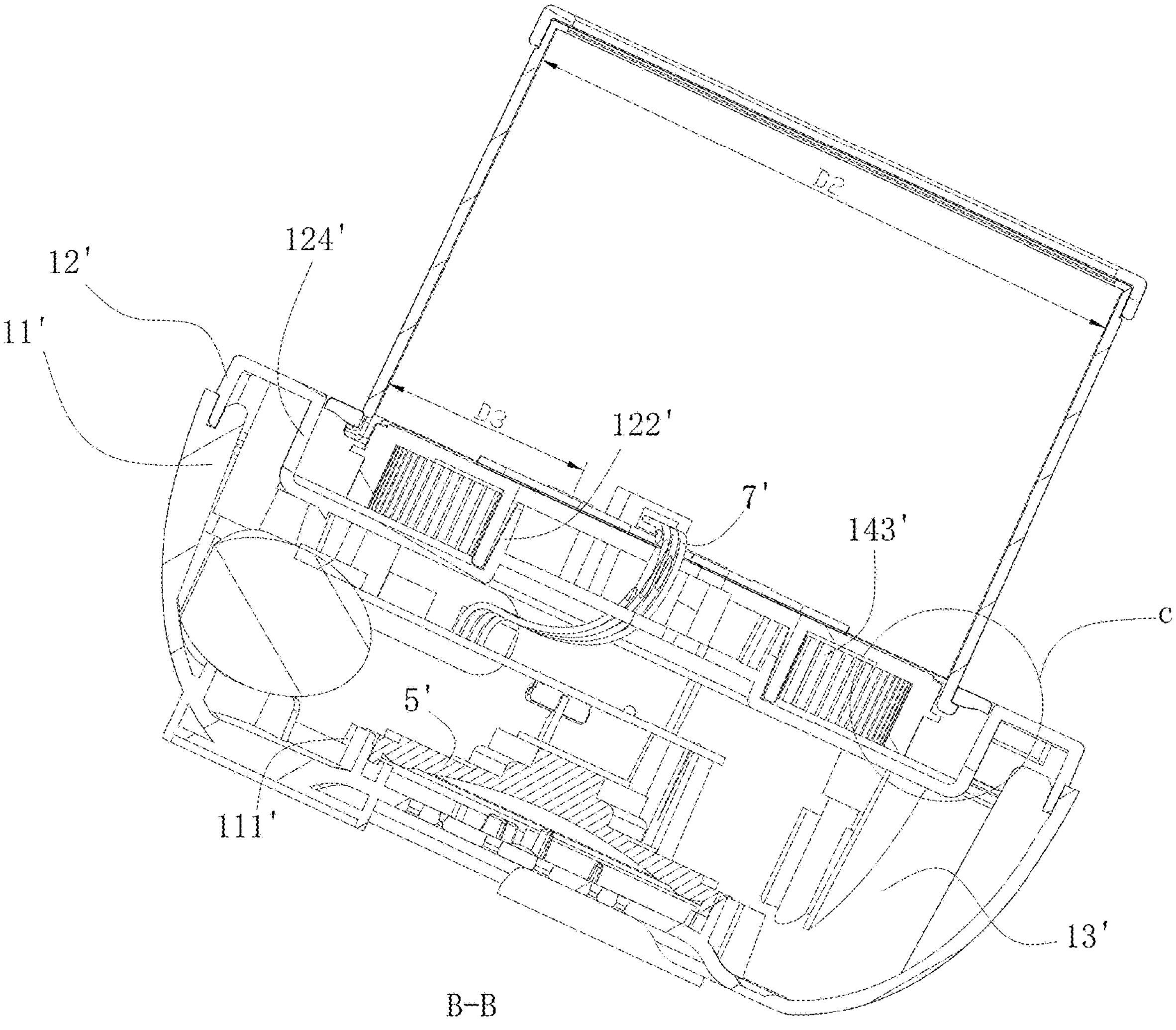
FIG. 11 is a cross-sectional view taken along line B-B in FIG. 10.
Figure 12:
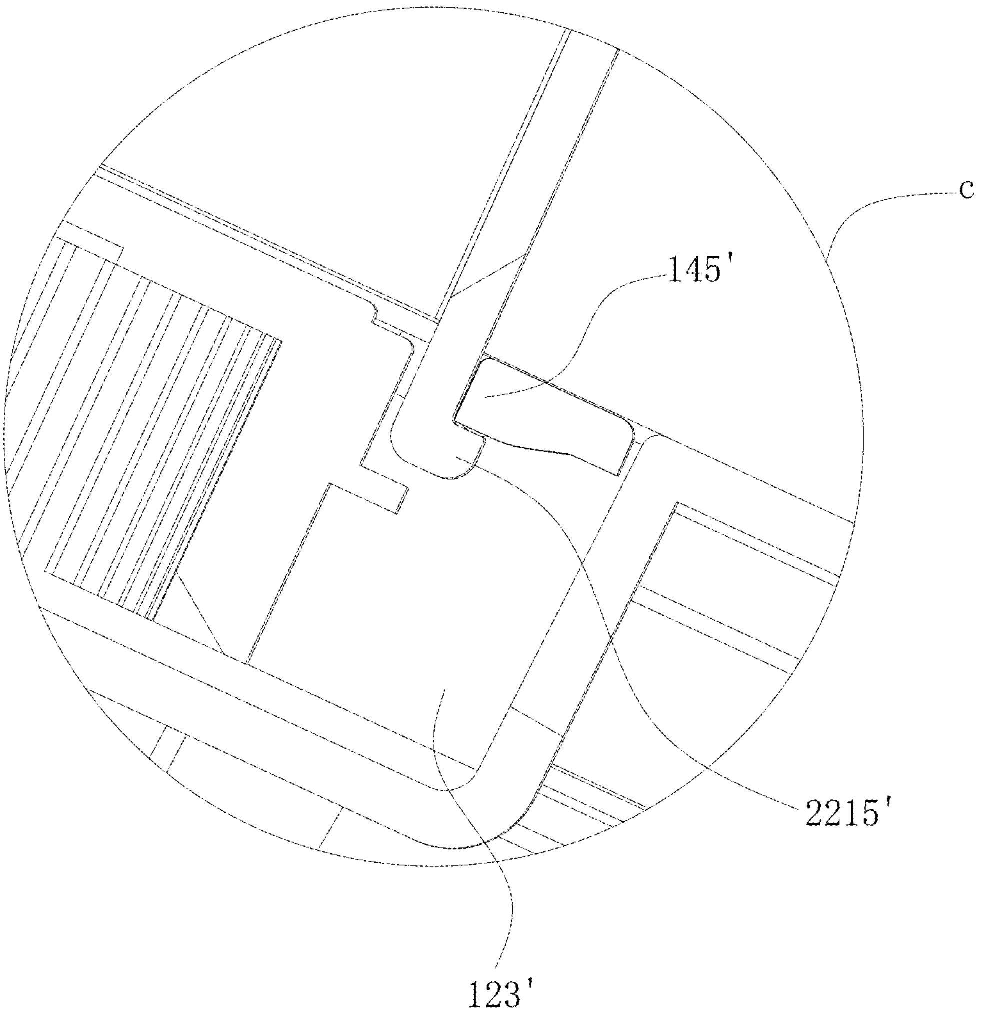
FIG. 12 is a partial enlarged view of area "c" in FIG. 11.

As shown in FIGS. 8, 11, and 12, the base 1' includes a receiving cavity 13', as well as a bottom shell 11' and an upper cover 12' that form the receiving cavity 13'. The bottom shell 11' includes a limiting wall 111' that protrudes into the receiving cavity 13'. The limiting wall 111' is arranged around the speaker hole of the bottom cover. The upper cover 12' includes a first hole 121' that penetrates upwards, a first limiting portion 122' arranged around the first hole 121', a supporting column 125' connected to the first limiting portion 122', and a first groove 123' arranged around the first limiting portion 122'. The sidewall of the first groove 123' forms a second limiting portion 124'. Multiple the supporting columns 125' are accommodated in the first hole 121'. The upper end of the supporting column 125' forms a positioning portion 126', or the positioning portion 126' is located on one side of the supporting column 125'. The upper cover 12' also includes a guiding groove 127' that is recessed downward from its top surface and a latch 128' connected to the sidewall of the guiding groove 127'. The guiding groove 127' and the latch 128' are exposed outward from the upper cover 12'. The base 1' further includes a turntable 14' accommodated in the first groove 123'. The turntable 14' includes a clearance hole 141' that penetrates vertically, a rotating shaft 142' arranged around the clearance hole 141', a gear ring 143', a slot 144', a snap-fit portion 145', and a light-blocking portion 146'. The gear ring 143' is arranged around the rotating shaft 142'. When the turntable 14' rotates, the first limiting portion 122' restricts the horizontal displacement of the rotating shaft 142', and the second limiting portion 124' restricts the horizontal displacement of the upper edge of the turntable 14', thereby improving the stability of the turntable 14' during rotation. The slot 144' is recessed downward from the top surface of the turntable 14'. The snap-fit portion 145' protrudes from the sidewall of the slot 144' into the slot 144'. The slot 144' is in vertical communication with the first groove 123'. The turntable 14' also includes a light-blocking portion 146' arranged around the first hole 121'. The light-blocking portion 146' is located outside the slot 144' and is spaced apart from the slot 144'. The light-blocking portion 146' can be in the form of a raised strip or a recessed structure.

Figure 7:
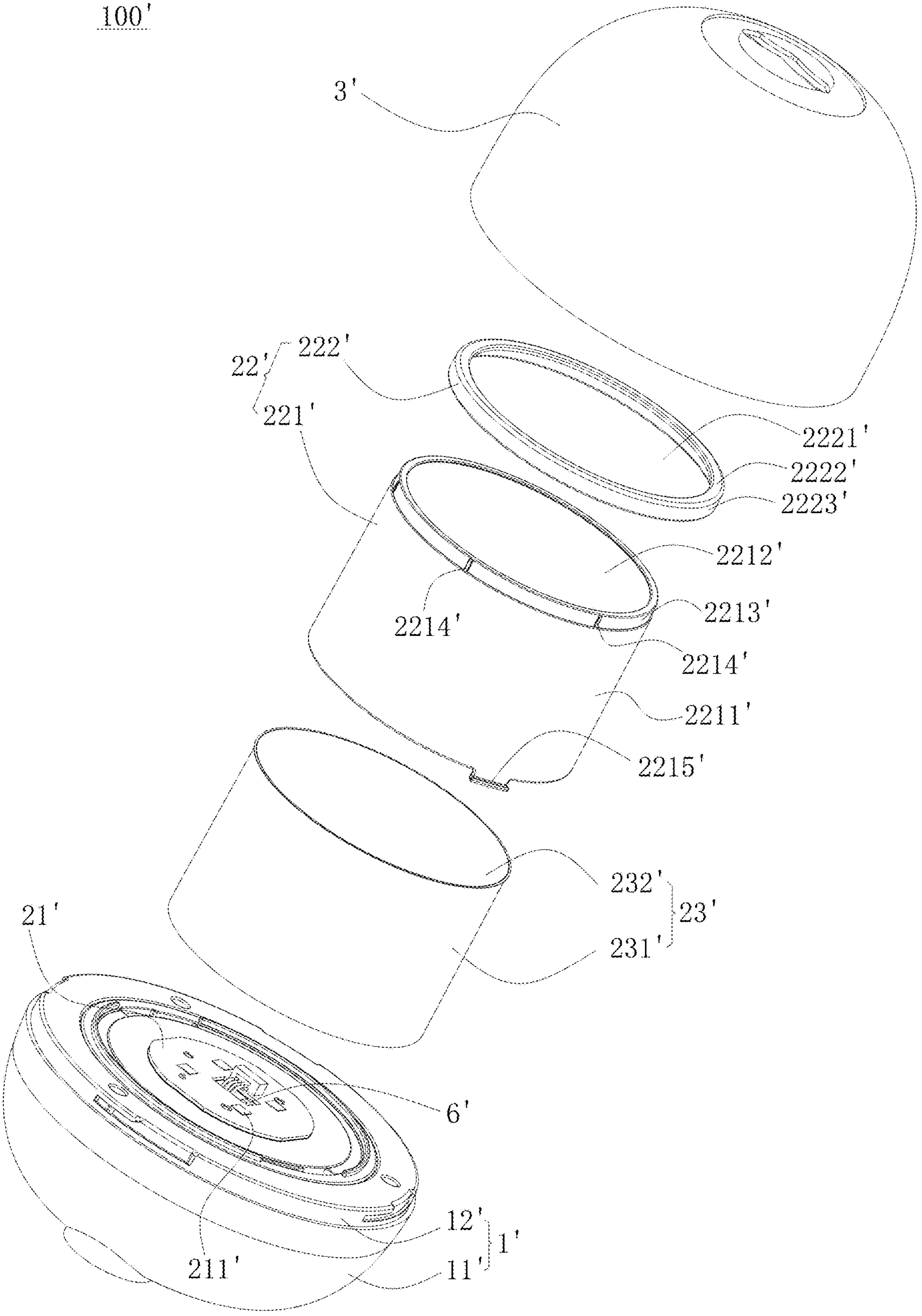
FIG. 7 is an exploded isometric view of the second embodiment of the ambient projection lamp in the present disclosure.
Figure 13:
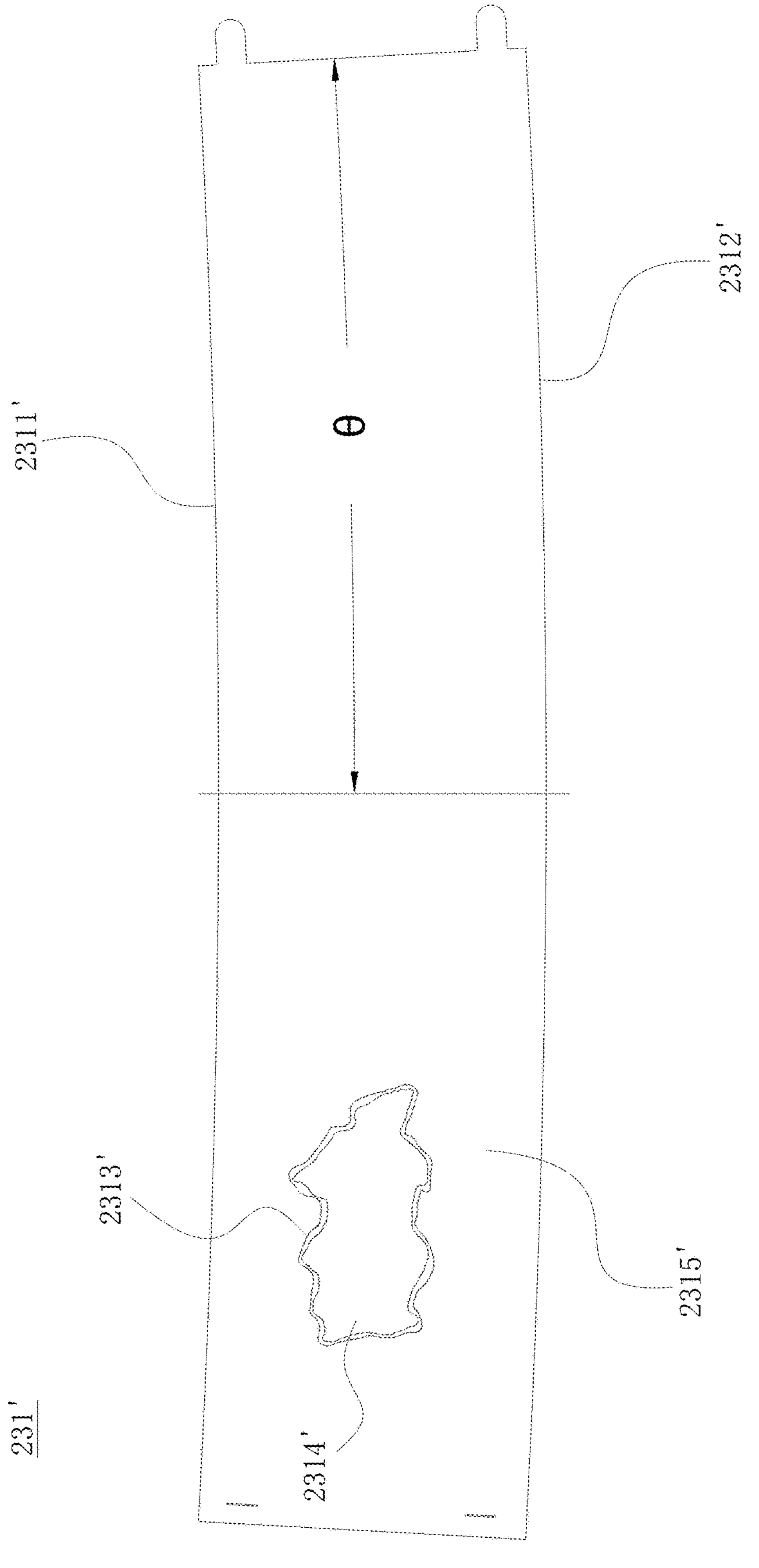
FIG. 13 is a schematic diagram showing the first projection slide in an unfolded state in FIG. 7.
Figure 14:
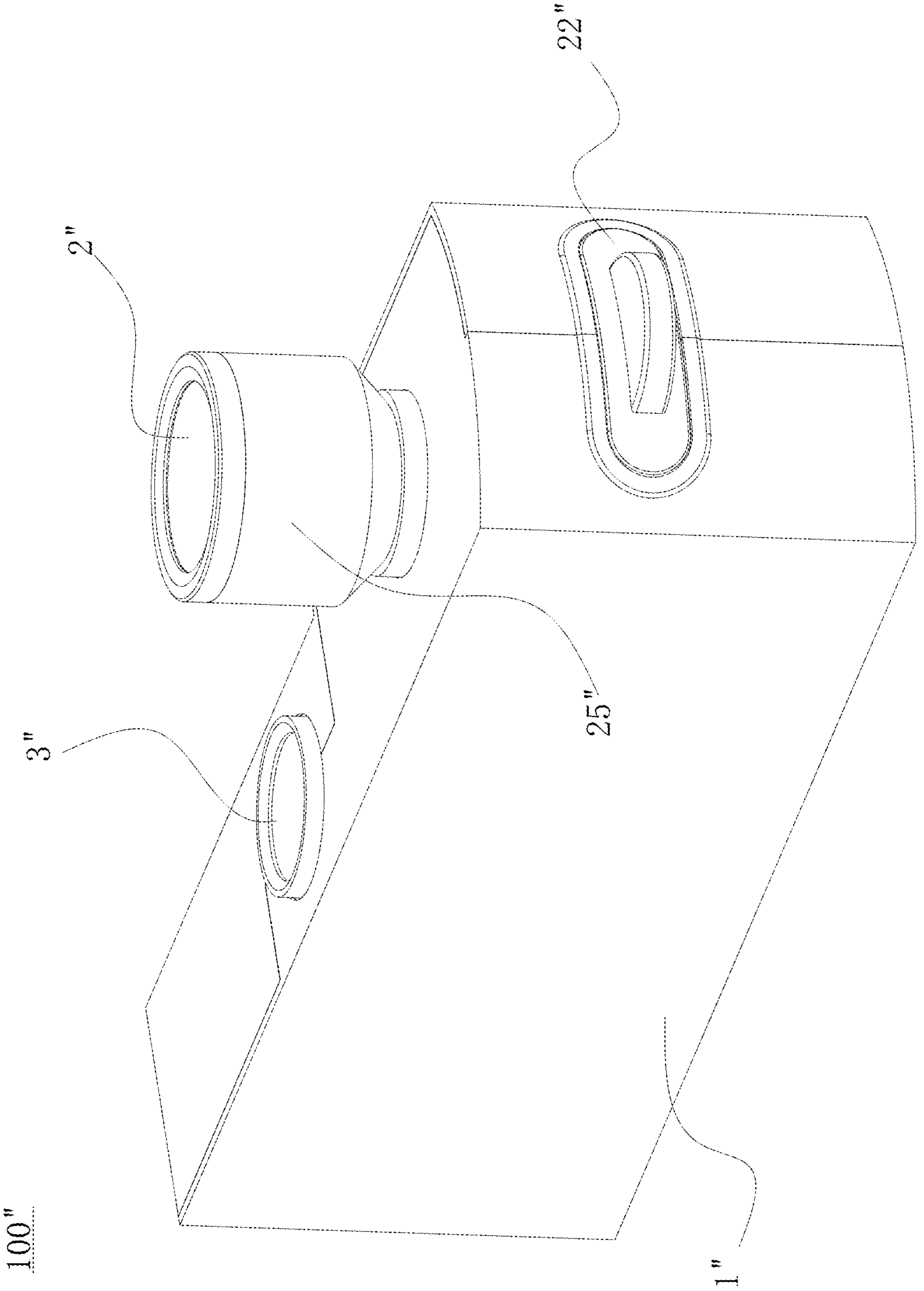
FIG. 14 is an isometric view of the third embodiment of the ambient projection lamp in the present disclosure.

As shown in FIGS. 7, 12, and 13, the first ambient assembly 2' includes a first lamp body 21', a support frame 22' located above the first lamp body 21', and a projection element 23' mounted on the support frame 22'. The first lamp body 21' includes a lamp board 211' and lamp beads 213' mounted on the lamp board 211'. The lamp board 211' includes a through-hole 212' and a fixing hole 214' that penetrate vertically. Before the lamp board 211' is fixed to the supporting column 125', it is pre-positioned at the positioning portion 126' to facilitate the installation of the lamp board 211'. The positioning portion 126' protrudes into the fixing hole 214'. The lamp beads 213' comprise a chip and a protective layer covering the chip. The minimum width of the chip is defined to be greater than 0.2 mm. The support frame 22' includes a first frame 221' and a second frame 222' that are fixed to each other. The first frame 221' includes a main body portion 2211', a snap-fit portion 145' extending downward from the main body portion 2211', and a support portion 2213' extending upward. The main body portion 2211' includes a mounting hole 2212' that penetrates vertically. The mounting hole 2212' has a width D1 at the bottom end and a width D2 at the top end, with D2<D1 or D2>D1. D1 is defined as the width at the bottom end of the mounting hole 2212', and D2 is defined as the width at the top end of the mounting hole 2212'. The measurement method for D2 and D1 is the same as that in the first embodiment. The mounting hole 2212' gradually decreases in size from bottom to top, facilitating the installation and removal of the projection slide. The support portion 2213' includes multiple limiting structures 2214' that are exposed outward. The second frame 222' includes a through-hole 2221', a blocking portion 2222' arranged around the through-hole 2221', and a mating portion 2223'. The mating portion 2223' is arranged around the support portion 2213'. The blocking portion 2222' is located above the support portion 2213'. The limiting structures 2214' abut against the mating portion 2223'. The limiting structures 2214' can be raised bumps connected to the support portion 2213'. Alternatively, in other embodiments, the limiting structures 2214' can be additional limiting plates located between the support portion 2213' and the mating portion 2223', forming a tight fit among the three. When the snap hook 2215' protrudes downward into the slot 144' and rotates to the snap-fit portion 145', the snap-fit portion 145' is at least partially accommodated in the first groove 123'. The light-blocking portion 146' surrounds the outside of the main body portion 2211', preventing light leakage from the bottom of the main body portion 2211'. When the light-blocking portion 146' is in the form of a recessed structure, the bottom end of the main body portion 2211' is at least partially accommodated in the groove. The projection element 23' includes at least one of the following: a film, a photographic film, a projection slide, a glass slide, a slide, or a wrinkled optical sheet. The projection element 23' includes a first projection portion 2314' and a second projection portion 2315', with different light transmittances between the first projection portion 2314' and the second projection portion 2315'. In this embodiment, the projection element 23' includes a first projection slide 231' and a second projection slide 232' located above the first projection slide 231'. The first projection slide 231' or the second projection slide 232' includes a first projection portion 2314' and a second projection portion 2315'. The light from the first lamp body 21' passes through the first projection portion 2314' and is projected outward to form a first projected region. The light from the first lamp body 21' passes through the second projection portion 2315' and is projected outward to form a second projected region. The luminance of the first projected region is higher than that of the second projected region, and the colors of the first projected region and the second projected region are different. The first projection portion 2314' includes a main projection portion and an outline 2313' arranged around the projection portion. The width of the outline 2313' is greater than the width of the chip. The first projection slide 231' includes a first end face 2311' and a second end face 2312' that are opposite to each other. The length of the second end face 2312' is greater than the length of the first end face 2311'. When D1 is larger than D2, the first projection slide 231' is installed in the mounting hole 2212' from top to bottom. When D1 is smaller than D2, the first projection slide 231' is installed in the mounting hole 2212' from bottom to top. At this time, the first projection slide 231' is at least partially in contact with the inner wall or outer wall of the mounting hole 2212'. The projection slides are arranged around the axis of the support frame 22' and rotate around the axis of the support frame 22'. The distance between the projection slide and the first lamp body 21' is defined as D3, with D3 satisfying 20 mm≤D3≤100 mm. D3 generally refers to the straight-line distance or the shortest distance from the lamp bead 213' to the first projection slide 231'. The second projection slide 232' is accommodated in the through-hole 2221'. The support portion 2213' and the blocking portion 2222' jointly clamp the first projection slide 231'. The second projection slide 232' is located directly above the first projection slide 231'. The light-transmitting cover 3' is placed over the outside of the support frame 22' and rotates along the guiding groove 127' to latch onto the latch 128'.

As shown in FIGS. 7 and 11, the driving assembly 4' is accommodated in the receiving cavity 13' and includes a gear 41' accommodated in the first groove 123'. The gear 41' mates with the gear ring 143'. The limiting wall 111' surrounds the speaker 5', forming a horizontal limit for the speaker 5'. Multiple screws are fixed to one side of the limiting wall 111'. The screw caps of the screws restrict the upward movement of the speaker 5'. The detector 6' is mounted on the bottom shell 11' and is exposed upward through the through-hole 212'. The detector 6' includes an electrically connected transmitting end 61' and a receiving end 62'. The transmitting end 61' emits a signal toward the first projection slide 231', and the signal is reflected by the first projection slide 231' to the receiving end 62'. When the projection element 23' is removed, the receiving end 62' does not receive the signal from the transmitting end 61', and the main board dims or turns off the luminance of the first lamp body 21'. The conductive wire 7' passes upward through the through-hole 212' and forms an electrical connection with the lamp board 211'.

As shown in FIGS. 14 to 23, it is the third embodiment of the ambient projection lamp 100" of the present disclosure. The ambient projection lamp 100" comprises a base 1" as well as a first ambient assembly 2" and a second ambient assembly 3" mounted on the base 1".

Figure 15:
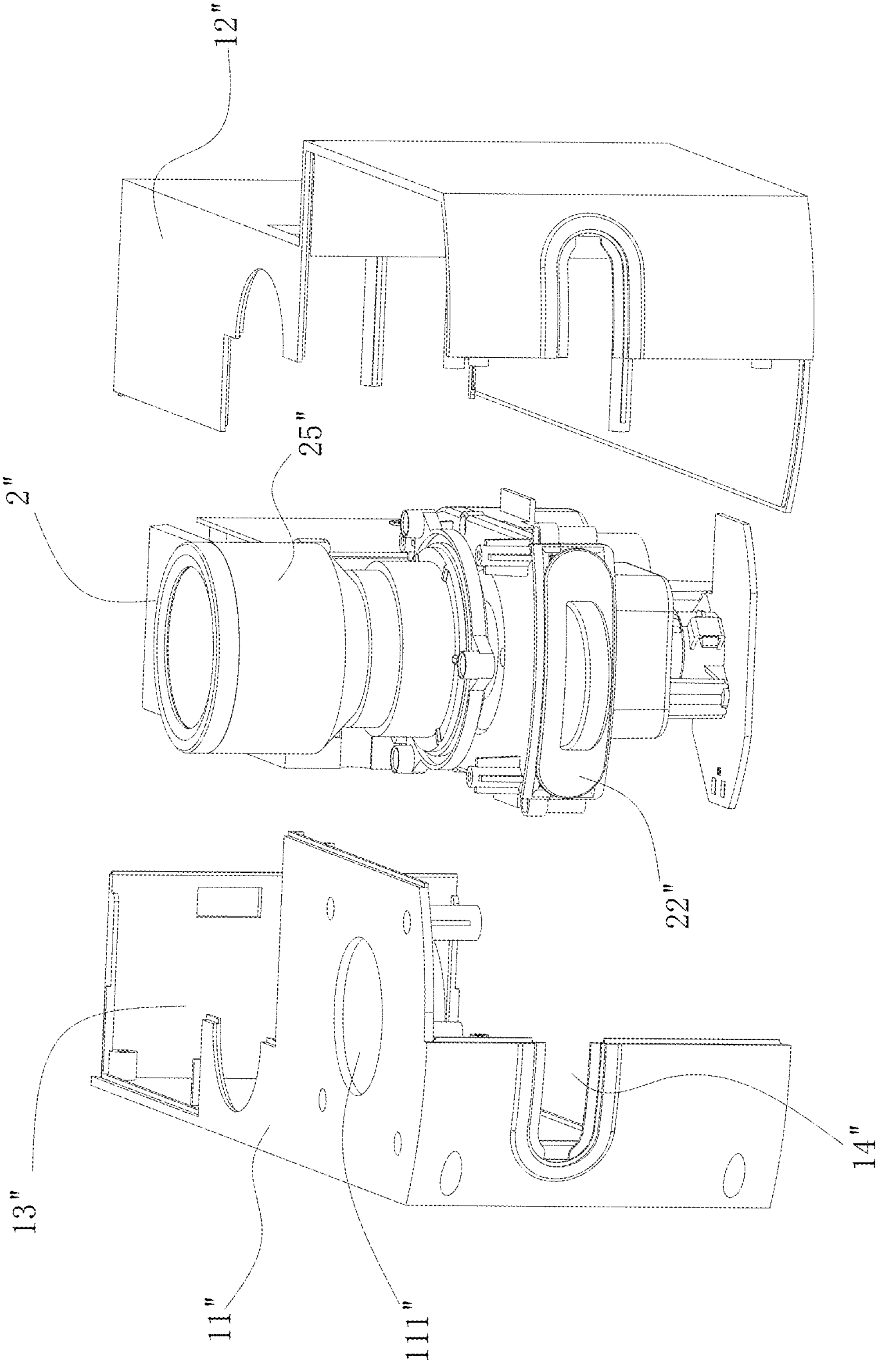
FIG. 15 is an exploded isometric view of FIG. 14.
Figure 16:
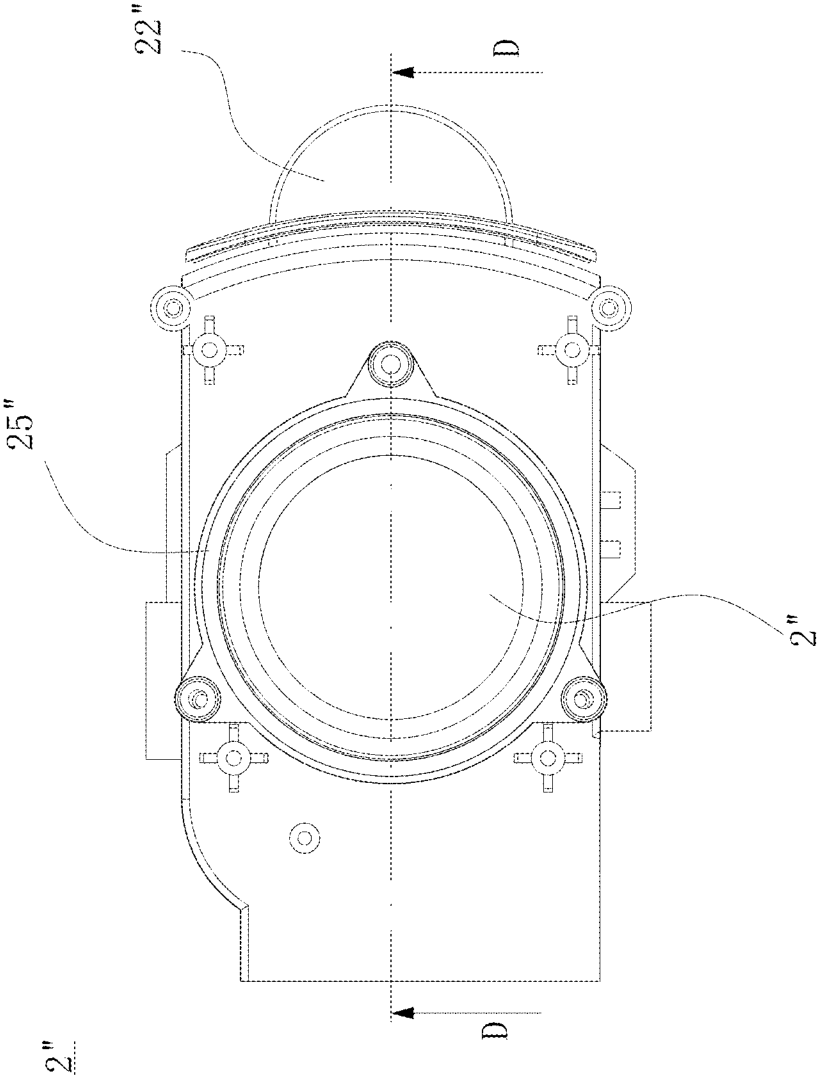
FIG. 16 is a top view of the first ambient assembly in FIG. 15.
Figure 17:
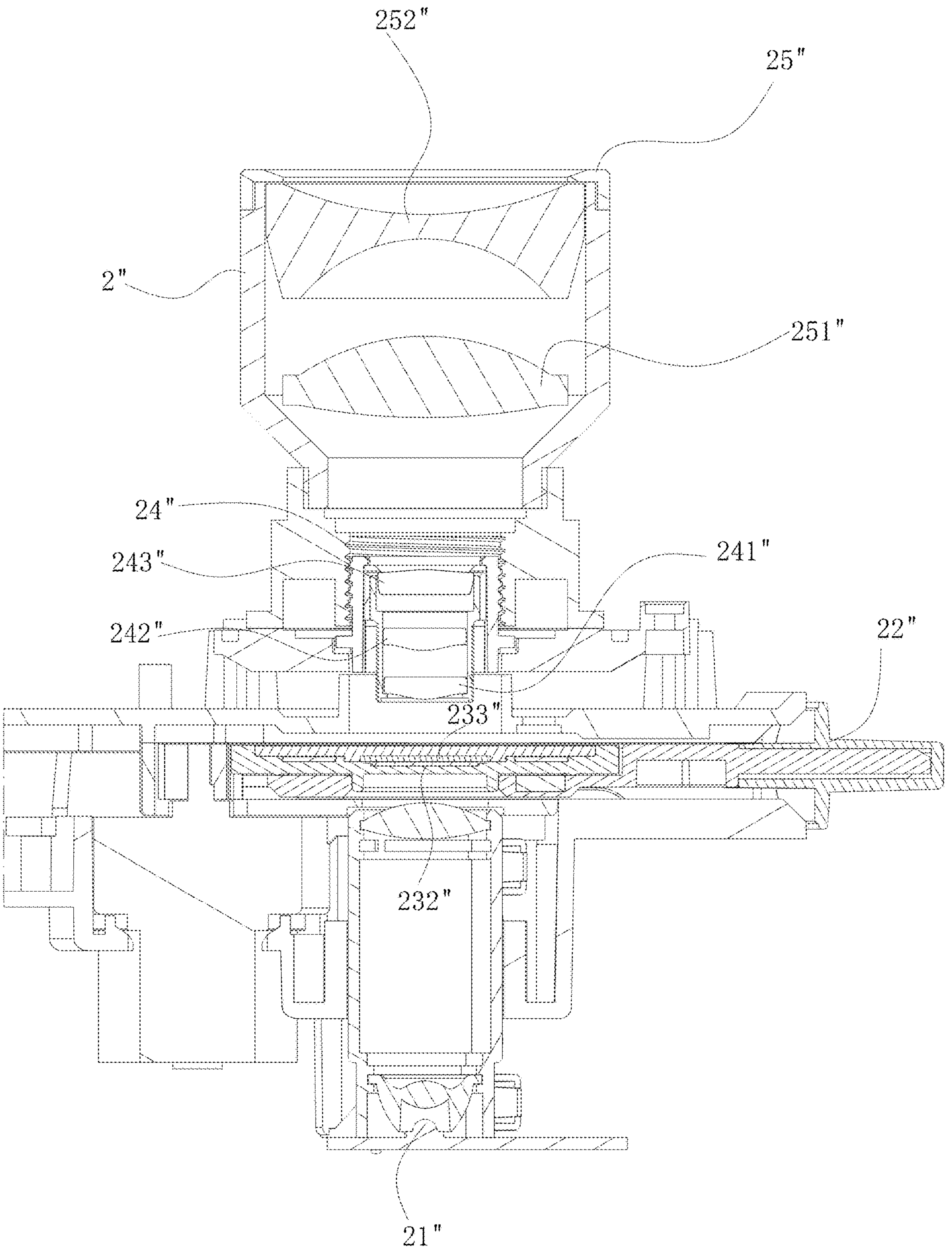
FIG. 17 is a cross-sectional view taken along line D-D in FIG. 16.

As shown in FIGS. 15 and 17, the base 1" includes a receiving cavity 13" and a first shell 11" and a second shell 12" that form the receiving cavity 13". The base 1" also includes a plugging and unplugging port 14" that is connected to the receiving cavity 13". The first shell 11" includes a through-going projection hole 111" that penetrates upwards. The projection hole 111", the receiving cavity 13", and the plugging and unplugging port 14" are interconnected with one another.

Figure 18:
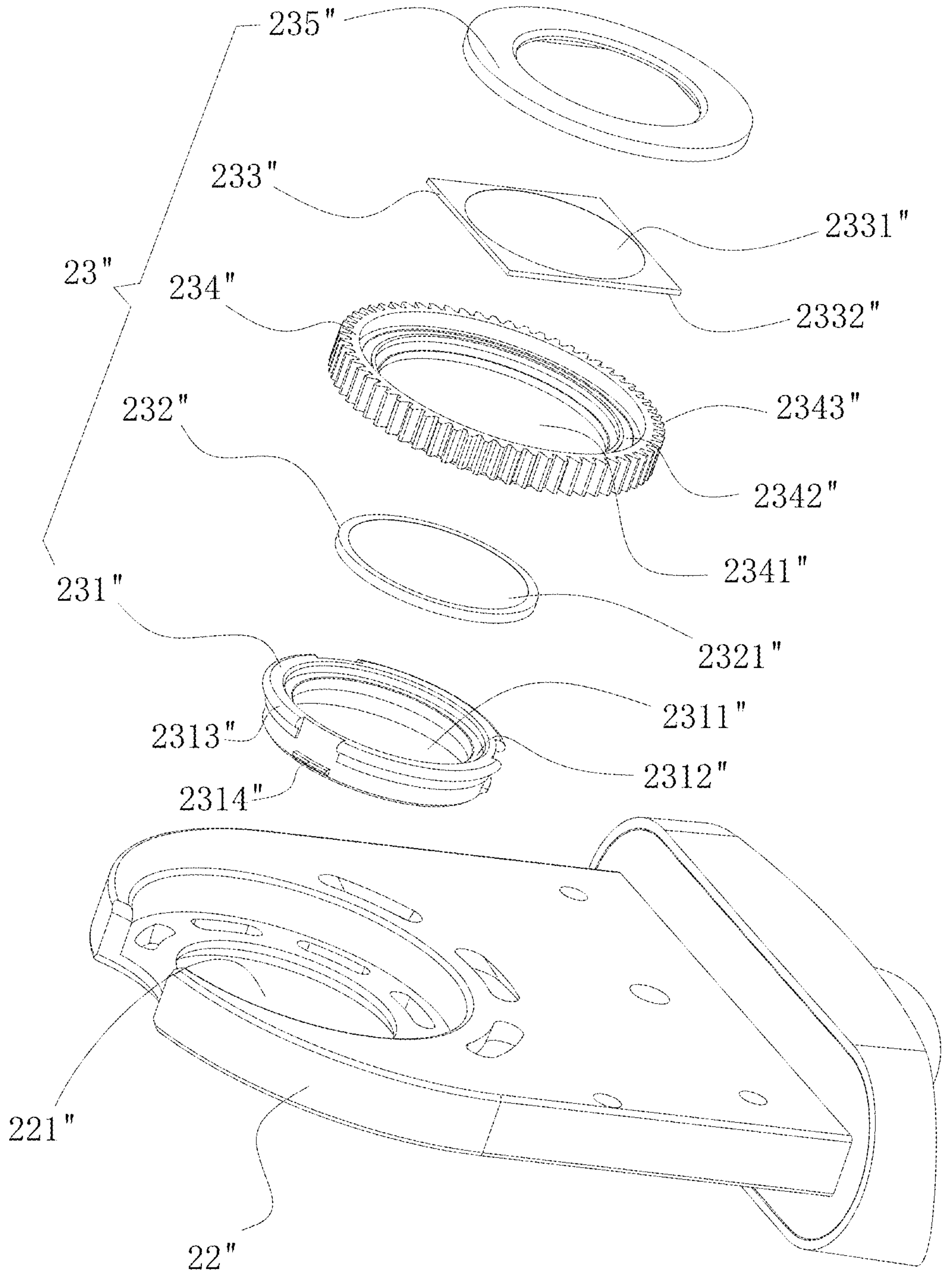
FIG. 18 is an exploded isometric view of the tray and projection element in FIG. 15.
Figure 19:
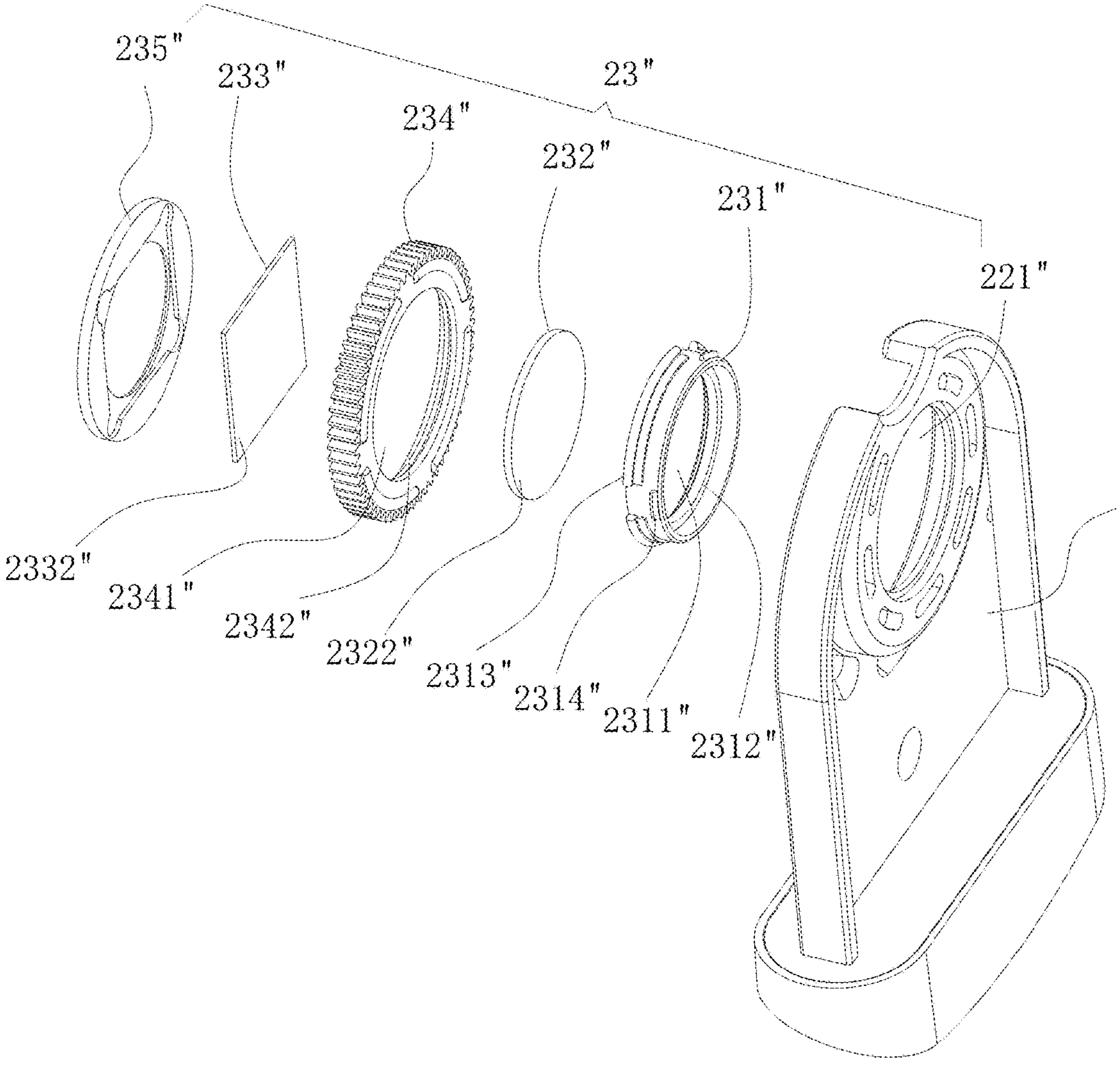
FIG. 19 is an exploded isometric view rotated by a certain angle in FIG. 18.

As shown in FIGS. 17, 18, and 19, the first ambient assembly 2" at least comprises a first lamp body 21", a projection element located above the first lamp body 21", and an imaging element 24" arranged in sequence. The first lamp body 21" is configured as a conventional LED lamp or a COB integrated lamp bead. When the first lamp body 21" is a COB integrated lamp bead, it can project parallel light, and the light distribution lens located between the first lamp body 21" and the projection element can be removed. The projection element is configured as a film, a photographic film, a projection slide, a glass slide, a slide, or a wrinkled optical sheet. The projection element at least includes one projection slide. The projection slide at least comprises a first projection portion and a second projection portion, with different light transmittance levels between the first projection portion and the second projection portion. The light emitted from the first lamp body 21" passes outward through the first projection portion to form a first projected area externally, and the light emitted from the first lamp body 21" passes outward through the second projection portion to form a second projected area externally. The color of the first projected area is different from that of the second projected area, and the luminance of the first projected area is higher than that of the second projected area. The first projected area and the second projected area together constitute the first projection effect of the first ambient assembly 2". The area of the first projection effect is defined as S1. The projection width of the first projection effect is defined as W1, and the central axis of the first projection effect is defined as A1. When the projection slide is a glass slide, it includes a glass substrate, a coated area, and a photolithographic area, with part of the coated area surrounding the photolithographic area. The first projection effect forms a dynamic or static light effect. The projected region of the first projection effect is defined as S1. In this embodiment, the first ambient assembly 2" includes a first lamp body 21", a tray 22", a rotating disk 23", an imaging element 24", and a fisheye lens 25". The tray 22" includes a through-going light-transmitting hole 221" that penetrates from top to bottom. The rotating disk 23" is optionally mounted on the tray 22". The rotating disk 23" includes a limiting member 231", a lower projection slide 232", a toothed ring portion 234", an upper projection slide 233", and a pressing plate 235". The limiting member 231" includes a through-hole 2311", a lower bearing portion 2312" arranged around the through-hole 2311", an upper limiting portion 2313", and a lower limiting portion 2314". The lower bearing portion 2312" is accommodated in the through-hole 2311", and the tray 22" is clamped between the upper limiting portion 2313" and the lower limiting portion 2314". The lower bearing portion 2312" supports the lower projection slide 232" upwards. The lower projection slide 232" includes a first surface 2321" and a second surface 2322" that are oppositely arranged, with the first surface 2321" being a patterned surface and the second surface 2322" being a non-patterned surface. When the lower projection slide 232" is a glass slide, the first surface 2321" is a photolithographic surface, and the second surface 2322" is a non-photolithographic surface, that is, a glass surface. The toothed ring portion 234" includes an opening 2341", an upper bearing portion 2342" arranged around the opening 2341", and teeth 2343". The upper bearing portion 2342" extends from the wall of the opening 2341" towards the center of the opening 2341". The upper projection slide 233" is accommodated in the opening 2341", and the upper limiting portion 2313" is arranged around the upper projection slide 233". The upper projection slide 233" is oppositely arranged with the lower projection slide 232". The upper projection slide 233" includes a third surface 2331" and a fourth surface 2332" that are oppositely arranged, with the third surface 2331" being a patterned surface and the fourth surface 2332" being a non-patterned surface. When the upper projection slide 233" is a glass projection slide, the third surface 2331" is a photolithographic surface, and the fourth surface 2332" is a non-photolithographic surface, that is, a glass surface. The first surface 2321" and the third surface 2331" are oppositely arranged, that is, the first surface 2321" and the third surface 2331" are in mutual contact or the spacing between the first surface 2321" and the third surface 2331" ranges from 0 mm to 1 mm. When the ambient projection lamp 100" is in operation, light passes through the upper projection slide 233" to form a dynamically projected first projection pattern externally, and light passes through the lower projection slide 232" to form a dynamically projected second projection pattern externally. At least part of the first projection pattern and at least part of the second projection pattern transition from being mutually separated to mutually overlapping. The lower projection slide 232" or the upper projection slide 233" at least includes a first projection portion and a second projection portion. The light emitted from the first lamp body 21" passes outward through the first projection portion to form a first projected area externally, and the light emitted from the first lamp body 21" passes outward through the second projection portion to form a second projected area externally. The color of the first projected area is different from that of the second projected area, and the luminance of the first projected area is higher than that of the second projected area. The first projected area and the second projected area together constitute the first projection effect of the first ambient assembly 2". The pressing plate 235" is located above the upper bearing portion 2342" and presses down on the upper projection slide 233". The imaging element 24" surrounds the upper part of the projection element. The imaging element 24" at least includes a first lens 241". In this embodiment, the imaging element 24" includes the first lens 241", a second lens 242", and a third lens 243" that are located above the projection slide. The width of the first lens 241" is d1. The first lens 241" is the imaging lens closest to the projection slide. The width of the light-transmitting area or the sampling area of the projection element is d2. wherein d1 is larger than or equal to d2, and the light-transmitting area refers to the area through which the light emitted from the first lamp body 21" passes through the projection slide in the using state. The spacing between the projection slide and the first lens 241" is defined as D6, wherein D6 satisfies ¼d1≤D6≤4d1. This spacing refers to the straight-line distance between the two. When the projection element is a wrinkled optical sheet, the light effects of the first projected area and the second projected area have different intensities. The fisheye lens 25" is fixed to the imaging element 24". Users can install or remove the fisheye lens 25" according to their needs. The fisheye lens 25" at least includes a fisheye lens element 252" located above the third lens 243". In this embodiment, the fisheye lens 25" includes an imaging lens 251" arranged in sequence and a fisheye lens element 252" located above the imaging lens 251". The imaging lens 251" is located above the third lens 243", and the fisheye lens element 252" is located above the imaging lens 251".

Figure 20:
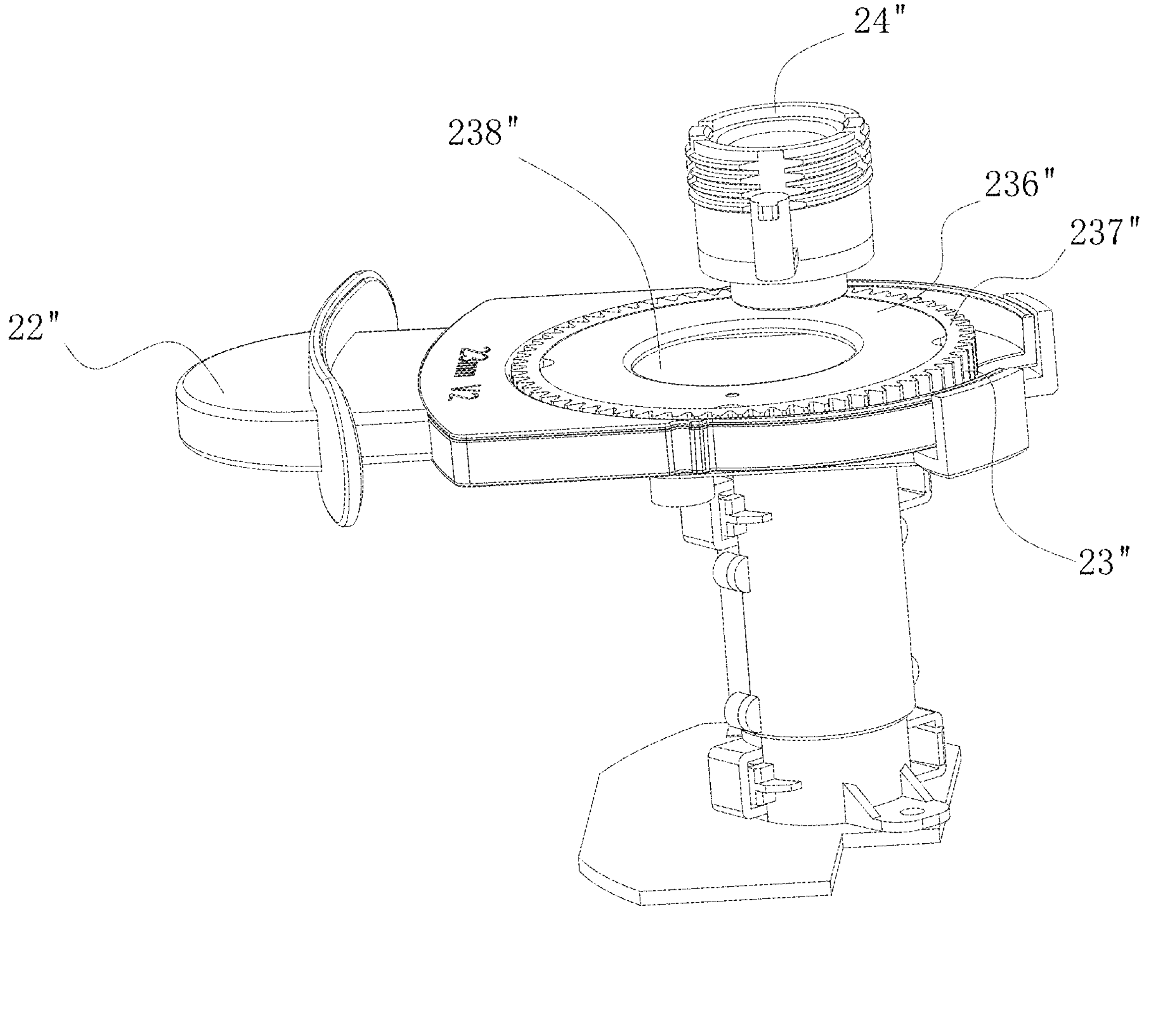
FIG. 20 is an assembled isometric view of another embodiment in FIG. 15.
Figure 21:
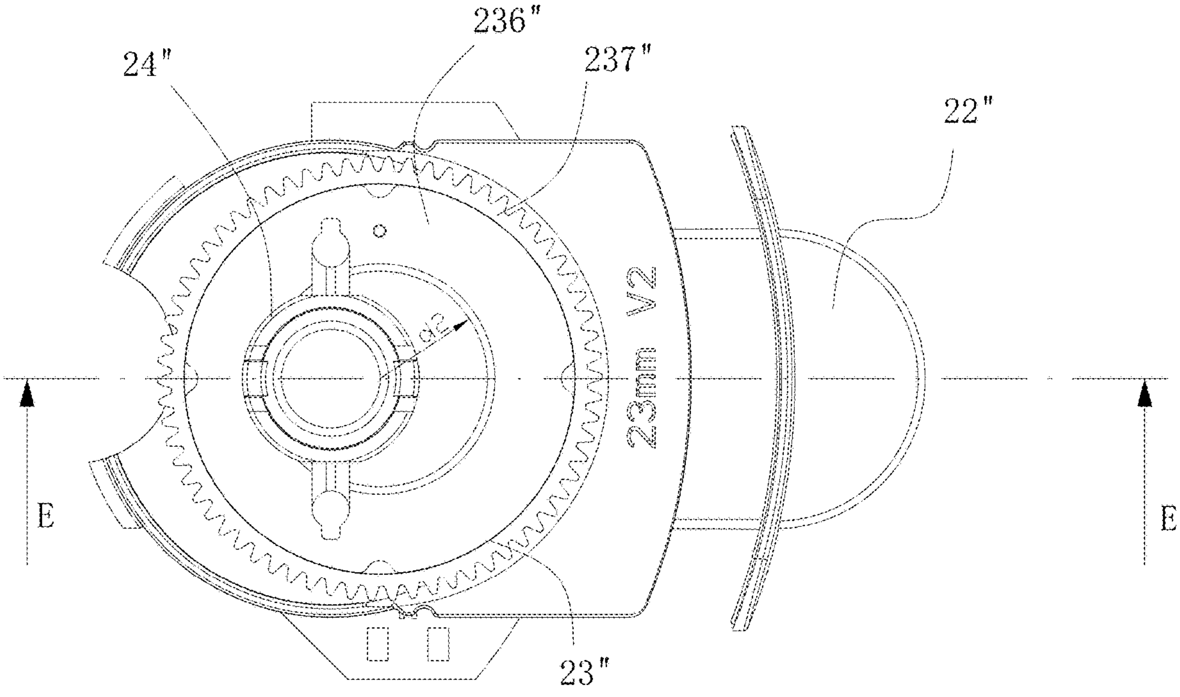
FIG. 21 is a top view of FIG. 20.
Figure 22:
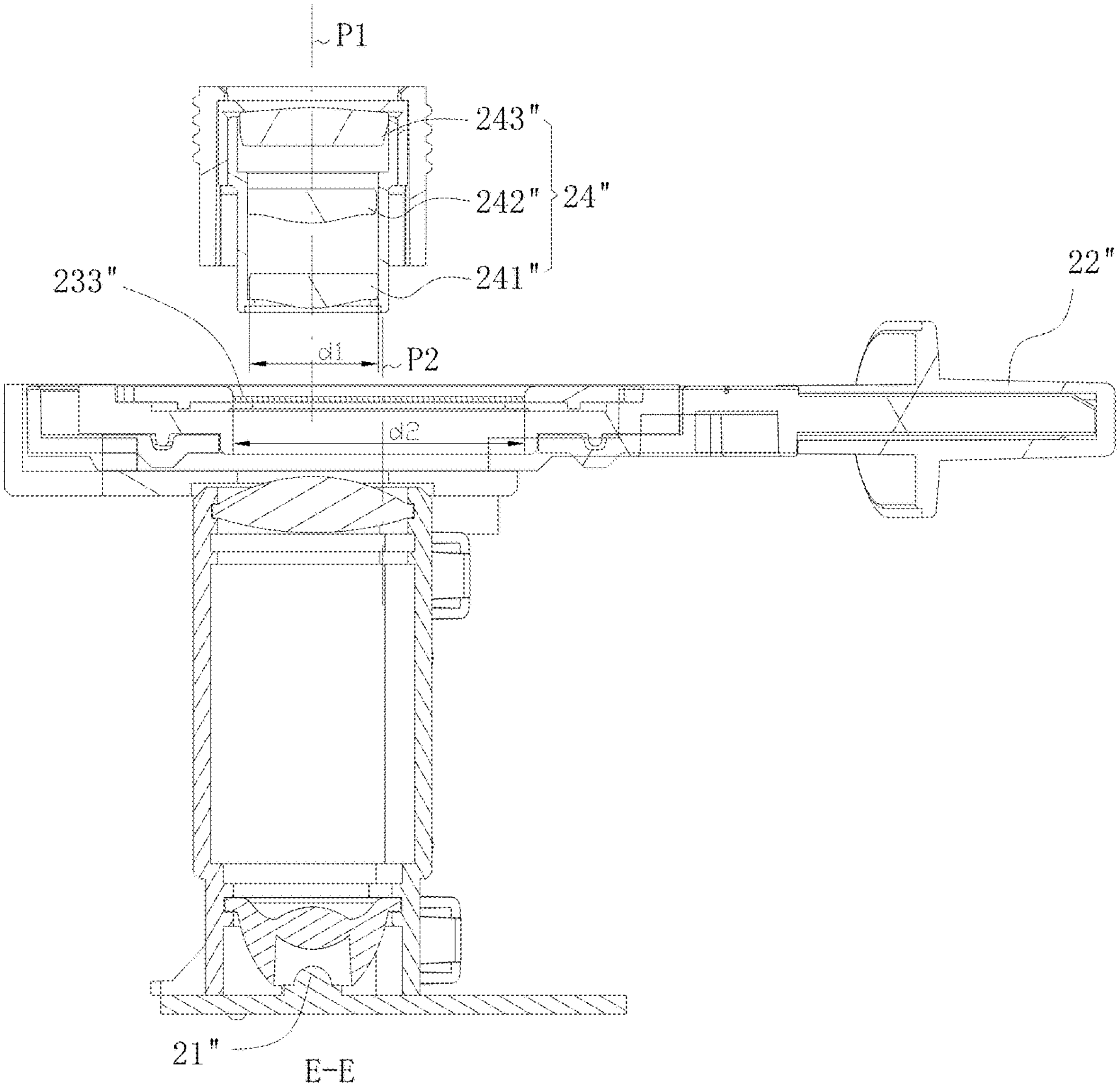
FIG. 22 is a cross-sectional view taken along line E-E in FIG. 21.
Figure 23:
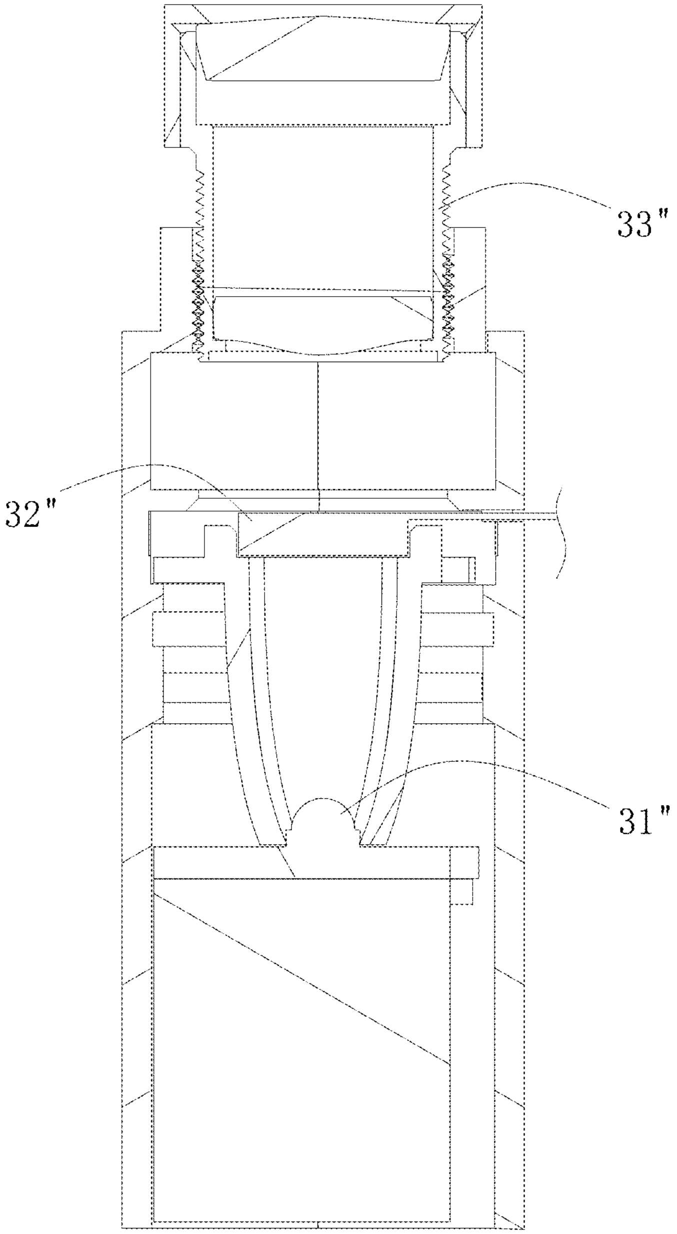
FIG. 23 is a schematic diagram of the second ambient assembly in FIG. 15.

As shown in FIGS. 20, 21, and 22, in other embodiments, the first ambiance assembly 2" comprises a first lamp body 21", a tray 22", a rotating disc 23", and an imaging element 24". The rotating disc 23" is mounted on the tray 22" and includes a disc body and a projection slide installed on the disc body. The central axis of the imaging element 24" is defined as P1, and the central axis of the projection slide is defined as P2. P1 and P2 do not coincide, with at least a portion of the projection slide located directly below the imaging element 24". As the projection slide rotates, the position where it aligns vertically with the imaging element 24" continuously changes, resulting in a gradual alteration of the projected pattern formed outwardly by the first ambient assembly 2". That is, the projection slide comprises at least a first projection section and a second projection section, with the projection patterns of the first and second projection sections being different. When the rotating disc 23" is in the first state, the first projection section aligns vertically with the imaging element 24", forming a first projected pattern outwardly. As the rotating disc 23" rotates, it enters the second state, where the second projection section aligns vertically with the imaging element 24", forming a second projected pattern outwardly. The imaging element 24" includes a first lens 241", a second lens 242", and a third lens 243" positioned above the projection slide. At least one of the lenses in the imaging element 24" has an anti-reflective coating applied to its surface, with the coating being placed on either the bottom or top surface of the lens. The width of the first lens 241" is defined as d1, and the width of the light-transmissive area or the sampling area width on the projection slide is defined as d2, with d2≥2d1. The disc body comprises an upper disc body 236" and a lower disc body 237" that are fixed to each other, with the projection slide being secured between them. Either the upper disc body 236" or the lower disc body 237" is provided with a mounting slot 238", in which the projection slide is accommodated. The projection element is exposed upwards through the upper disc body 236" and downwards through the lower disc body 237". The upper disc body 236" and the lower disc body 237" are fixed together using at least one of the following methods: snap-fit structure, ultrasonic welding, adhesive bonding, or screw fixation.

As shown in FIG. 22, the second ambient assembly 3" comprises at least a second lamp body 31", a projection screen 32" positioned above the second lamp body 31", and an imaging lens 33" positioned above the projection screen 32". The second ambient assembly 3" creates a second projected effect outwardly, forming an animated projection. The projected region of the second projected effect is S2, with S2<S1. Preferably, S2 of the second projected effect is less than half of S1 of the first projected effect. The first and second projected effects blend with each other, comprising complete or partial overlap, with the preference being for the second projected effect to be located in the central position of the first projected effect. The first projected light effect creates a wide-angle projection, while the second projected light effect draws the observer's attention. The combination of projection effects with different ranges enhances the sense of immersion in the ambiance. The projection width of the second projected effect is defined as W2, where W1 is greater than W2. The central axis of the second projected effect is A2, with A1 and A2 either coinciding or being offset from each other. The second projected effect is a video animation projection, which is located in the central position of the first projected effect. The video animation projection gradually becomes clearer, or the overlapping position between the second projected effect and the first projected effect continuously changes.

In summary, the ambient projection lamp of the present disclosure offers the following beneficial effects.

(1) By installing the first ambient assembly on the base, which includes at least a first lamp body and a projection element positioned above the first lamp body. The projection element comprises at least one of the following: a film, a photographic film, a projection slide, a glass slide, or a slide. The projection element includes a first projection section and a second projection section. The light from the first lamp body passes through the first projection section to project outward and form a first projected region, while the light passes through the second projection section to project outward and form a second projected region. The luminance of the first projected region is higher than that of the second projected region, and the colors of the two projected regions differ. By forming projected regions with different colors and luminance levels, the diversity of the projection effects is enhanced, elevating the ambiance and sense of immersion in the projection.

(2) The imaging element includes at least a first lens. The width of the first lens is defined as d1, and the width of the light-transmissive area of the projection element is defined as d2, with d1≥d2. This design fully utilizes the light-transmissive region of the projection element, improving both the utilization rate of the projection element and the light utilization efficiency.

(3) The projection element comprises an upper projection slide and a lower projection slide. The upper projection slide includes a first surface and a second surface positioned opposite each other, with the first surface being the patterned surface. The lower projection slide includes a third surface and a fourth surface positioned opposite each other, with the third surface being the patterned surface. The first surface is positioned opposite the third surface, while the second surface and the fourth surface face away from each other. This arrangement ensures that the upper projection slide and the lower projection slide are easily focused and guarantees projection clarity for both.

(4) When the ambient projection lamp is in operation, the upper projection slide projects a dynamic first projected pattern outward, while the lower projection slide projects a dynamic second projected pattern outward. At least part of the first projected pattern transitions from being separate to overlapping with at least part of the second projected pattern. Existing structures offer only a single dynamic effect, which is limited. This technical solution combines two dynamic effects, enhancing dynamic aesthetic appeal.

(5) The first ambient assembly further includes a fisheye lens positioned above the imaging element. The imaging element comprises a first lens, a second lens, and a third lens. The fisheye lens includes at least a fisheye lens positioned above the third lens, expanding the projection range and enhancing the user's sense of immersion.

(6) The projection slide includes at least a first projection section and a second projection section, with the patterns of the first and second projection sections being different. When the rotating disc is in the first state, the first projection section aligns vertically with the imaging element, forming a first projected pattern outward. As the rotating disc rotates, it enters the second state, where the second projection section aligns vertically with the imaging element, forming a second projected pattern outward. This design not only creates multiple projection effects but also reduces the utilization rate of either the first or second projection section, extending the lifespan of the projection slide. In existing structures, the entire projection slide is projected upon, leading to easy fading.

(7) The imaging element includes at least a first lens. The width of the first lens is defined as d1, and it is the imaging lens closest to the projection slide. The spacing between the projection slide and the first lens is defined as D6, where D6 satisfies $\frac{1}{4}d1 \leq D6 \leq 4d1$. This optimizes the installation position range of the projection slide, avoiding issues caused by excessive distance or proximity that could affect projection clarity.

(8) The imaging element comprises multiple lenses, with at least one of the lenses having an anti-reflective coating applied to its surface. The coating is placed on either the bottom or top surface of the lens, enhancing light utilization efficiency.

(9) The projection element is configured as the projection slide. The first projection section includes a main projection section and an outline surrounding the main projection section. The minimum width of the chip in the first lamp body is defined as greater than 0.2 mm, and the width of the outline is greater than the width of the chip, ensuring that the first projection section projects a clear real image.

(10) The projection slide includes a first end face and a second end face positioned opposite each other, with the length of the second end face being greater than that of the first end face. This allows the projection slide to form a conical hollow structure before installation, facilitating its placement into the mounting hole. Additionally, the first projection slide projects reflected stray light downward, reducing stray light projection onto the second projection slide and minimizing the impact of stray light on the projection effect.

(11) The ambient projection lamp includes a support frame and a driving assembly that drives the support frame. The projection slide is positioned on the support frame. The driving assembly includes a drive shaft, with the support frame being fixedly connected to the drive shaft; alternatively, the driving assembly includes gears that cooperate with a gear ring on the support frame. This eliminates the need for a rotating disc structure, reducing costs.

The above detailed description represents preferred embodiments of the present disclosure and does not limit the scope of the disclosure's patent rights. Therefore, any equivalent technical changes made based on the content of this disclosure's description and illustrations are included within the scope of this disclosure's patent rights.

What is claimed is:

1. An ambient projection lamp, comprising:

a first ambient assembly comprising a first lamp body, a projection element and an imaging element located above the first lamp body; a projection element is located between the first lamp body and the imaging element; the projection element is configured as a projection slide or a wrinkled optical sheet; the projection slide or the wrinkled optical sheet comprises a first projection portion and a second projection portion; light emitted by the first lamp body passes through the first projection portion and the imaging element outward to form a first projected region; the light emitted by the first lamp body passes through the second projection portion and the imaging element outward to form a second projected region; a color of the first projected region is different from that of the second projected region, or intensity of the light effects in the first projected region is different from that in the second projected region; the first ambient assembly comprises a rotating disk; the rotating disk comprises an upper disk body, a lower disk body, the projection element is exposed upward from the upper disk body and downward from the lower disk body, the upper disk body and the lower disk body are fixed in at least one of the following ways: snap-fit structure fixation, ultrasonic fixation, adhesive bonding fixation, or screw fixation.

2. The ambient projection lamp according to claim 1, the rotating disk comprises at least one projection slide fixed between the upper disk body and the lower disk body; the upper disk body or the lower disk body is provided with an installation slot, and the projection slide is accommodated in the installation slot.

3. The ambient projection lamp according to claim 1, wherein the projection slide is a glass slide comprising a glass substrate, a coated area, and a photolithographed area, wherein part of the coated area is arranged around the photolithographed area.

4. The ambient projection lamp according to claim 1, wherein the projection element comprises an upper projection slide and a lower projection slide; the lower projection slide comprises a first surface and a second surface that are opposite to each other, and the first surface is a pattern surface; the upper projection slide comprises a third surface and a fourth surface that are opposite to each other, and the third surface is a pattern surface; the first surface and the third surface are opposite to each other, and the second surface and the fourth surface are away from each other.

5. The ambient projection lamp according to claim 4, wherein: when the ambient projection lamp is in operation, light passes through the upper projection slide to project a dynamic first projection pattern outward, and light passes through the lower projection slide to project a dynamic second projection pattern outward; at least part of the dynamic first projection pattern and at least part of the dynamic second projection pattern change from being separated to overlapping with each other.

6. The ambient projection lamp according to claim 1, wherein the first ambient assembly further comprises a fisheye lens located above the imaging element; the imaging element comprises a first lens, a second lens, and a third lens; the fisheye lens comprises a fisheye lens element located above the third lens.

7. The ambient projection lamp according to claim 1, wherein a central axis of the imaging element is defined as P1, and a central axis of the projection slide is defined as P2; P1 and P2 do not coincide; at least part of the projection slide is located directly below the imaging element; as the projection slide rotates, the position where the projection slide and the imaging element are aligned in the vertical direction continuously changes, causing the first projection pattern projected outward by the first ambient assembly to gradually change.

8. The ambient projection lamp according to claim 7, wherein patterns of the first projection portion and the second projection portion are different; when the rotating disk is in a first state, the first projection portion and the imaging element are aligned vertically, and a first projection pattern is projected outward; as the rotating disk rotates, the rotating disk is in a second state, the second projection portion and the imaging element are aligned vertically, and a second projection pattern is projected outward.

9. An ambient projection lamp, comprising: a first ambient assembly comprising a first lamp body, a projection element and an imaging element located above the first lamp body; a projection element is located between the first lamp body and the imaging element; the projection element is configured as a projection slide or a wrinkled optical sheet; the projection slide or the wrinkled optical sheet comprises a first projection portion and a second projection portion; light emitted by the first lamp body passes through the first projection portion and the imaging element outward to form a first projected region; the light emitted by the first lamp body passes through the second projection portion and the imaging element outward to form a second projected region; a color of the first projected region is different from that of the second projected region, or intensity of the light effects in the first projected region is different from that in the second projected region; wherein the imaging element at least comprises a first lens; width of the first lens is defined as d1, and the first lens is the imaging lens closest to the projection slide; a distance between the projection slide and the first lens is defined as D6, wherein D6 satisfies $\frac{1}{4}d1 \leq D6 \leq 4d1$.

10. The ambient projection lamp according to claim 1, wherein the imaging element comprises a plurality of lenses, and at least one of the lenses has an anti-reflection coating on its surface; the anti-reflection coating is provided on the bottom surface or the top surface of the lens.

* * * * *